United States Patent
Ahn et al.

(10) Patent No.: US 9,690,684 B2
(45) Date of Patent: Jun. 27, 2017

(54) COMPONENT FOR NETWORK SYSTEM

(75) Inventors: Junho Ahn, Gyeongsangnam-do (KR); Yanghwan Kim, Gyeongsangnam-do (KR); Hoonbong Lee, Gyeongsangnam-do (KR); Koonseok Lee, Gyeongsangnam-do (KR); Minchel Kim, Gyeongsangnam-do (KR); Yonghun Kim, Gyeongsangnam-do (KR); Seungje Park, Gyeongsangnam-do (KR); Eunkyung Seo, Gyeongsangnam-do (KR); Younghyo Son, Gyeongsangnam-do (KR); Sangmin Yeo, Gyeongsangnam-do (KR)

(73) Assignee: LG ELECTRONICS INC., Seoul (KR)

( * ) Notice: Subject to any disclaimer, the term of this patent is extended or adjusted under 35 U.S.C. 154(b) by 443 days.

(21) Appl. No.: 13/806,522

(22) PCT Filed: Jun. 27, 2011

(86) PCT No.: PCT/KR2011/004650
§ 371 (c)(1),
(2), (4) Date: Aug. 15, 2013

(87) PCT Pub. No.: WO2011/162579
PCT Pub. Date: Dec. 29, 2011

(65) Prior Publication Data
US 2014/0040458 A1    Feb. 6, 2014

(30) Foreign Application Priority Data

Jun. 26, 2010  (KR) .................. 10-2010-0060881
Jun. 26, 2010  (KR) .................. 10-2010-0060904

(Continued)

(51) Int. Cl.
*G06F 11/30* (2006.01)
*G06Q 50/06* (2012.01)
*G06Q 10/10* (2012.01)

(52) U.S. Cl.
CPC ...... *G06F 11/3065* (2013.01); *G06F 11/3058* (2013.01); *G06Q 10/10* (2013.01); *G06Q 50/06* (2013.01)

(58) Field of Classification Search
CPC . G06F 11/3065; G06F 11/3058; G06Q 10/10; G06Q 50/06

(Continued)

(56) References Cited

U.S. PATENT DOCUMENTS 5,261,031 A * 11/1993 Saito ................. G09G 1/162
  345/440
6,437,799 B1 * 8/2002 Shinomi ............. G06T 11/206
  345/666

(Continued)

FOREIGN PATENT DOCUMENTS

JP    2002-51462 A    2/2002
JP    2008-295193 A   12/2008

(Continued)

OTHER PUBLICATIONS

C. Potter, et al.: "Building a Smarter Smart Grid Through Better Renewable Energy Information", IEEE/PES Power Systems Conference and Exposition, Mar. 15, 2009, pp. 1-5.

Primary Examiner — Charles Kasenge
(74) Attorney, Agent, or Firm — Dentons US LLP

(57) ABSTRACT

A component for a network system is provided. The component includes an information notification part capable of notifying of one or more pieces of certain information among energy information, additional information except the energy information, and new information based on one or more the energy information and the additional informa- (Continued)

tion and a control unit controlling the information notification part. The information notification part notifies of the certain information when satisfying conditions for notifying of the certain information.

26 Claims, 25 Drawing Sheets

(30) Foreign Application Priority Data

Jun. 26, 2010 (KR) .................. 10-2010-0060908
Sep. 17, 2010 (KR) .................. 10-2010-0091438
Nov. 26, 2010 (WO) .................. PCT/IB2010/003388

(58) Field of Classification Search
USPC ...... 700/286, 291, 295, 296; 702/60, 61, 62; 705/412; 709/224
See application file for complete search history.

(56) References Cited

U.S. PATENT DOCUMENTS

| | | | | |
|---|---|---|---|---|
| 6,972,771 B2* | 12/2005 | Nakano | ............... | G06F 3/0481 345/589 |
| 7,062,361 B1 | 6/2006 | Lane | | |
| 7,130,719 B2* | 10/2006 | Ehlers | ............... | F24F 11/0012 700/276 |
| 7,343,226 B2* | 3/2008 | Ehlers | ............... | F24F 11/0012 700/276 |
| 7,379,997 B2* | 5/2008 | Ehlers | ............... | F24F 11/0012 702/182 |
| 7,418,428 B2* | 8/2008 | Ehlers | ............... | F24F 11/0012 345/582 |
| 7,479,949 B2* | 1/2009 | Jobs | ............... | G06F 3/0488 345/169 |
| 7,516,106 B2* | 4/2009 | Ehlers | ............... | F24F 11/0012 705/412 |
| 7,949,615 B2* | 5/2011 | Ehlers | ............... | F24F 11/0012 700/276 |
| 8,121,737 B2* | 2/2012 | West | ............... | G06Q 30/04 700/286 |
| 8,255,090 B2* | 8/2012 | Frader-Thompson | . | G01D 4/002 700/295 |
| 8,406,933 B2* | 3/2013 | Nagel | ............... | H04L 67/125 700/286 |
| 8,855,829 B2* | 10/2014 | Golden | ............... | G05B 15/02 700/291 |
| 2004/0117330 A1* | 6/2004 | Ehlers | ............... | F24F 11/0012 705/412 |
| 2004/0133314 A1* | 7/2004 | Ehlers | ............... | F24F 11/0012 700/276 |
| 2004/0138981 A1* | 7/2004 | Ehlers | ............... | F24F 11/0012 705/36 R |
| 2004/0139038 A1* | 7/2004 | Ehlers | ............... | F24F 11/0012 705/412 |
| 2005/0033707 A1* | 2/2005 | Ehlers | ............... | F24F 11/0012 705/412 |
| 2005/0138929 A1 | 6/2005 | Enis et al. | | |
| 2007/0043477 A1* | 2/2007 | Ehlers | ............... | F24F 11/0012 700/276 |
| 2007/0043478 A1* | 2/2007 | Ehlers | ............... | F24F 11/0012 700/276 |
| 2007/0239317 A1 | 10/2007 | Bogolea et al. | | |
| 2008/0122796 A1* | 5/2008 | Jobs | ............... | G06F 3/0488 345/173 |
| 2009/0157529 A1* | 6/2009 | Ehlers | ............... | F24F 11/0012 705/26.1 |
| 2009/0195349 A1* | 8/2009 | Frader-Thompson | . | G01D 4/002 340/3.1 |
| 2010/0004791 A1* | 1/2010 | West | ............... | G06Q 30/04 700/291 |
| 2011/0046806 A1* | 2/2011 | Nagel | ............... | H04L 67/125 700/291 |
| 2011/0164055 A1* | 7/2011 | McCullough | ....... | G06F 3/04845 345/642 |
| 2012/0068854 A1* | 3/2012 | Shiflet | ............... | G06Q 50/06 340/870.02 |

FOREIGN PATENT DOCUMENTS

| | | |
|---|---|---|
| KR | 10-0701110 B1 | 3/2007 |
| KR | 10-2007-0098172 A | 10/2007 |
| KR | 10-2008-0015032 A | 2/2008 |
| KR | 10-2008-0092408 A | 10/2008 |
| KR | 10-2009-0046543 A | 5/2009 |

* cited by examiner

COMPONENT FOR NETWORK SYSTEM

This application is a 35 U.S.C. §371 National Stage entry of International Application No. PCT/KR2011/004650, filed on Jun. 27, 2011, and claims priority to U.S. Korean Application Nos. 10-2010-0060908, filed Jun. 26, 2010, Korean Application Nos. 10-2010-0060881, filed Jun. 26, 2010, Korean Application Nos. 10-2010-0060904, filed Jun. 26, 2010, Korean Application Nos. 10-2010-0091438, filed Sep. 17, 2010, and PCT/IB2010/003388, filed Nov. 26, 2010, all of which are hereby incorporated by reference in its entirety as if fully set forth herein.

BACKGROUND

The present disclosure relates to a component for a network system.

Providers simply provide energy sources such as electricity, water, and gas, and consumers simply use supplied energy sources. Accordingly, it is difficult to effectively manage energy in aspects of producing, distributing, or using the same. Accordingly, there is required a network system for effectively managing energy.

SUMMARY

Embodiments provide a component for a network system capable of effectively administrating energy sources.

In one embodiment, a component for a network system includes an information notification part capable of notifying about one or more pieces of certain information among energy information, additional information except the energy information, and new information based on one or more the energy information and the additional information and a control unit controlling the information notification part. When satisfying conditions for notifying of the certain information, the information notification part notifies the certain information.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
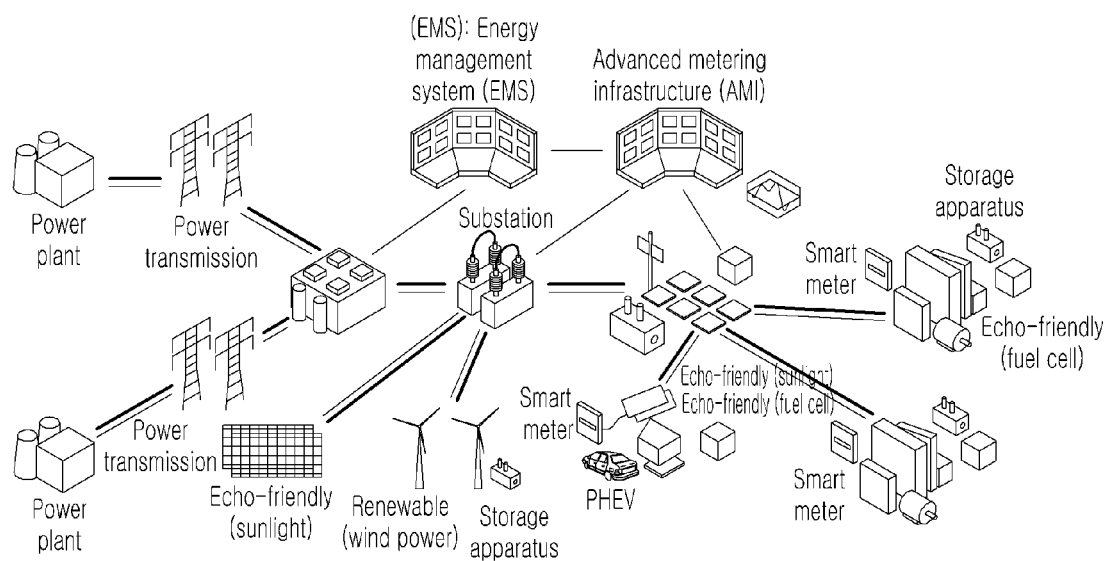
FIG. 1 is a view schematically showing an example of a network system according to the present disclosure.

FIG. 1 is a view schematically showing an example of a network system according to the present disclosure.

The network system is a system for managing an energy source such as electricity, water or gas. The energy source means one of which amount generated or used can be metered. Therefore, even a source not mentioned above may be used as the energy source. Hereinafter, electricity will be described as an example of the energy source, and details of this specification may be identically applied to other energy sources.

Referring to FIG. 1, a network system according to an embodiment includes a power plant for producing electricity. The power plant may include a power plant for producing electricity through a thermal power generation or nuclear power generation and a power plant using water power, sunlight power, wind power or the like which is eco-friendly energy.

The electricity produced in the power plant is transmitted to a sub-control center through a power transmission line, and the sub-control center transmits the electricity to a substation so that the electricity is distributed to customers such as houses or offices.

Electricity produced by the eco-friendly energy is also transmitted to the substation so as to be distributed to each of the customers. The electricity transmitted from the substation is distributed to each of the offices or houses through electricity power storage, or is directly distributed to each of the offices or houses.

In a house using a home area network (HAN), electricity may be produced by itself through sunlight, fuel cells built in a plug-in hybrid electric vehicle (PHEV), or the like. Also, the produced electricity may be stored or distributed, or surplus electricity may be resold to the outside world.

The network system may include a smart meter for detecting the amount of electricity used in each customer (house, office or the like) in real time, and an advanced metering infrastructure (AMI) for metering the amount of electricity used in a plurality of customers.

The network system may further include an energy management system (EMS) for managing energy. The EMS may generate information on operations of one or more components with respect to energy (production of energy, distribution of energy, usage of energy, storage of energy, and the like). The EMS may generate at least a command for the operations of the components.

In this specification, a function or solution performed by the EMS may be referred to as an energy management function or energy management solution.

In the network system, one or more EMSs may be provided as a separate configuration, or the EMS may be included as an energy management function or energy management solution in one or more components.

Figure 2:
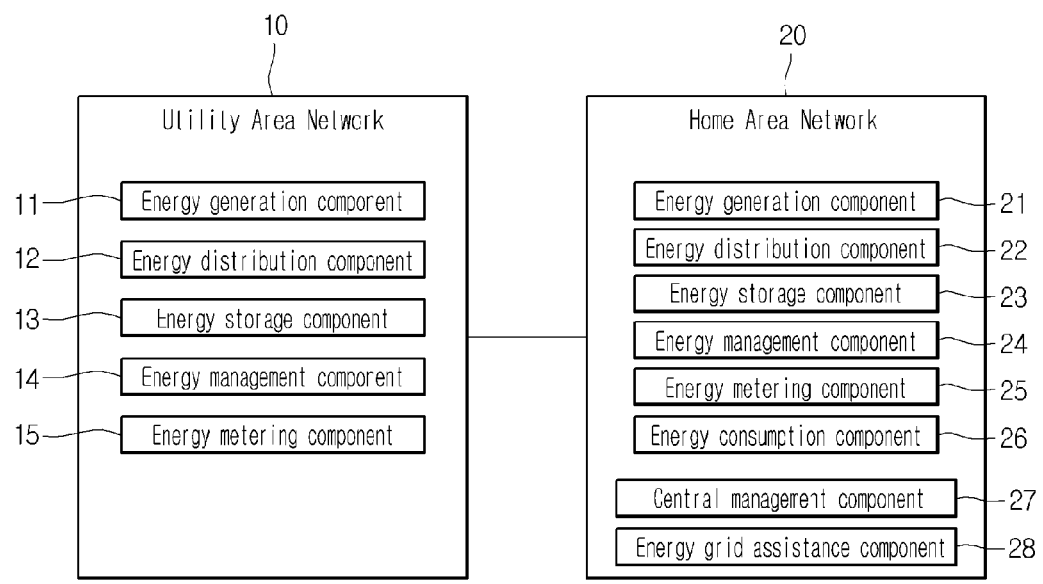
FIG. 2 is a block diagram schematically showing an example of the network system according to the present disclosure.

FIG. 2 is a block diagram schematically showing an example of the network system according to the present disclosure.

Referring to FIGS. 1 and 2, the network system according to the present disclosure is configured by a plurality of components. For example, the components of the network system are a power plant, a substation, a sub-control center, an EMS, electric home appliances, a smart meter, a storage battery, a web server, an AMI, a home server, and the like.

In the present disclosure, each of the components may be configured by a plurality of sub-components. As an example, in a case of one component is an electric home appliance, sub-components may be a microcomputer (MICOM), a heater, a display and the like. That is, all that perform a specific function may be components in the present disclosure, and such components constitute the network system of the present disclosure. Two components may communicate with each other by means of a communication unit. One network may be one component or may be configured by a plurality of components.

In this specification, the network system in which communication information is related to an energy source may be referred to as an energy grid.

A network system according to an embodiment may include a utility area network (UAN) 10 and a home area network (HAN) 20. The UAN 10 and the HAN 20 may perform wired or wireless communication by means of a communication unit, and may perform two-way communication.

In this specification, the term "home" means not only a household as a lexical meaning but also a group in which specific components such as buildings or companies gather. Also, the term "utility" means a group in which specific components outside the home gather.

The UAN 10 includes an energy generation component 11 for generating energy, an energy distribution component 12 for distributing or transmitting energy, an energy storage component for storing energy, an energy management component 14 for managing energy, and an energy metering component 15 for metering information related to energy.

In a case where one or more components that constitute the UAN 10 consume energy, the components that consume the energy may be energy consumption components.

The energy consumption component is a component corresponding to the energy consumption component 26 that constitutes the HAN 20. The energy consumption component may be the same component as the energy consumption component 26 or may be another component distinguished from the energy consumption component 26.

The energy generation component 11 may be a power plant as an example. The energy distribution component 12 distributes or transmits energy generated in the energy generation component 11 and/or energy stored in the energy storage component 13 to the energy consumption component 26 that consumes the energy. The energy distribution component 12 may be a power transmitter, substation, sub-control center, or the like.

The energy storage component 13 may be a storage battery, and the energy management component 14 generates information for driving one or more of the energy generation component 11, the energy distribution component 12, the energy storage component 13 and the energy consumption component 26, related to energy. The energy management component 14 may generate at least a command for the operation of a specific component.

The energy management component 14 may be an EMS. The energy metering component 15 may meter information related to the generation of energy, the distribution of energy, the usage of energy, the storage of energy, and the like. The energy metering component 15 may be an AMI as an example. The energy management component 14 may be a separate configuration, or may be included in another component as an energy management function.

The UAN 10 may communicate with the HAN 20 by a terminal component (not shown). That is, information generated or transferred in a specific component that constitutes the UAN may be transmitted to the HAN 20 through the terminal component, or information generated or transferred in another component that constitutes the HAN 20 may be received to the UAN 10 through the terminal component. The terminal component may be a gate way as an example. The terminal component may be provided to one or more of the UAN 10 and the HAN 20.

The terminal component may be a component necessary for transmitting/receiving information between the UAN and the HAN.

Two components that constitute the UAN 10 may communicate with each other by means of a communication unit.

The HAN 20 includes an energy generation component 21 for generating energy, an energy distribution component 22 for distributing energy, an energy storage component 23 for storing energy, an energy management component 24 for managing energy, an energy metering component 25 for metering information related to energy, an energy consumption component 26 for consuming energy, a central management component 27 for controlling a plurality of components, and an energy grid assistance component 28.

The energy generation component 21 may be a home power generator, and the energy storage component 23 may be a storage battery. The energy management component 24 may be an EMS. As an example, the energy generation component 21 may be a solar cell, a fuel cell, a wind power generator, a power generator using subterranean heat, a power generator using seawater, or the like.

The energy storage component 23 may perform storage using energy generated from the energy generation component 21. Therefore, in view of the use of energy, the energy storage component 23 and the energy generation component 11 may be an energy using component that uses energy together with the energy consumption component 26. That is, the energy using component may include at least an energy consumption component, an energy generation component and an energy storage component. In a case where the energy management component uses energy, it may be included in the energy using component.

In view of the supplied energy, the energy storage component 23, the energy consumption component and the energy generation component 11 may be an energy supplied component to which energy is supplied.

The energy metering component 25 may meter information related to the generation of energy, the distribution of energy, the usage of energy, the storage of energy, and the like. The energy metering component 25 may be a smart meter as an example. The energy consumption component 26 may be, as an example, an electric home appliance or a heater, motor, display or the like, which constitutes the electric home appliance. In this embodiment, there is no limitation in the kind of the energy consumption component 26.

Additionally, the home area network 20 may further include one of an accessory component and a consumable handling component. The accessory component is only for an energy grid, performing additional functions for the energy grid. For example, the accessory component may be a weather forecast receiving antenna only for the energy grid.

The consumable handling component is a component for storing, supplying, and transferring consumables and may check or recognize information on the consumables. The consumables may be, as an example, products or materials used or handled during the operation of the component. The consumable handling component may be managed by, as an example, the energy management unit in the energy grid. For example, the consumables may be laundry in a washing machine, items to be cooked in a cooking appliance, detergent or a fabric conditioner for laundry in a washing machine, and seasoning for cooking food.

Specifically, the energy generation component 21 may be another component of the UAN 10, which generates energy to be supplied to the HAN 20.

The energy management component 24 may be provided as a separate configuration or may be included in another component as an energy management function. As an example, the energy management function may be performed by a control component that controls the energy consumption component. In a case where the control component performs the energy management function, it may be an energy management component.

Specifically, the energy management component 14 that constitutes the UAN 10 or the energy management component 24 that constitutes the HAN 20 may be built in one or more of the plurality of components that constitute the networks 10 and 20, or may exist as a separate device. The energy management component 24 may recognize the information related to energy (energy information) and the state information of a component controlled by the energy management component 24.

The energy generation component 21, the energy distribution component 22 and the energy storage component 23 may be individual components, or may constitute a single component.

The central management component 27 may be, as an example, a home server for controlling a plurality of electric home appliances.

The energy grid assistance component 28 is a component having a primary function while performing an additional function for the energy grid. For example, the energy grid assistance component 28 may be a web service providing component (e.g., a computer or the like), mobile device, television, or the like.

The mobile device may receive energy information or additional information (described later), and control the operation of at least the energy consumption component 26 using the received information.

Two components that constitute the HAN 20 may communicate with each other by means of a communication unit.

The energy generation components 11 and 21, the energy distribution components 12 and 22, the energy storage components 13 and 23, the energy management components 14 and 24, the energy metering components 15 and 25, the energy consumption component and the central management component 27 may independently exist, or two or more of them may constitute a single component.

For example, the energy management component 14 or 24, the energy metering component 15 or 25 and the central management component 27 may exist as single components so as to be configured as a smart meter, an EMS and a home server, which perform their functions, respectively. Alternatively, the energy management component 14 or 24, the energy metering component 15 or 25 and the central management component 27 may constitute a single system.

When a function is performed, it may be sequentially performed in a plurality of components and/or communication units. For example, an energy management function may be sequentially performed in the energy management component, the energy metering component and the energy consumption component.

In the network system, a plurality of UANs 10 may communicate with a single HAN 20, and a single UAN 10 may communicate with a plurality of HANs 20.

The component with a specific function, which constitutes the UAN and the HAN, may be configured as a plurality of components. For example, the energy generation component, the energy consumption component or the like may be configured as a plurality of components.

In this specification, each of the components that constitute the UAN and HAN may having a function performing component that performs its own function, or each of the components itself may be a function performing component.

As an example, in a case where the energy consumption component is an electric product, the electric product has a function performing component such as a heater, compressor, motor or display. As another example, in a case where the energy consumption component is a heater, compressor, motor, display or the like, the energy consumption component itself is a function performing component.

Figure 3:
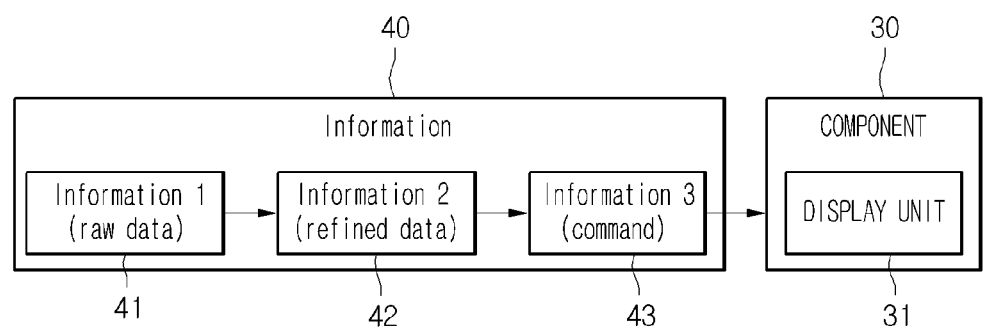
FIG. 3 is a block diagram showing an information transmission process on the network system according to the present disclosure.

FIG. 3 is a block diagram showing an information transmission process on the network system according to the present disclosure.

Referring to FIG. 3, in the network system according to the present disclosure, a specific component 30 may receive information related to energy (hereinafter, referred to as energy information 40) by means of a communication unit. The specific component 30 may further receive additional information (environment information, time information and the like) by means of the communication unit. In this instance, the information may be received from another component. That is, at least energy information is contained in the received information.

The specific component 30 may be a component that constitutes the UAN 10 or a component that constitutes the HAN 20.

As described above, the energy information 40 may be one of information related to electricity, water, gas and the like. Hereinafter, information related to electricity will be described as an example of the energy information, but information related to other energy sources may be identically applied.

For example, the kind of information related to the electricity may include time-based pricing, curtailment, grid emergency, grid reliability, energy increment, operation priority, and the like.

The information may be divided into scheduled information previously produced based on previous information, and real-time information changed in real time. The scheduled information and the real-time information may be divided by whether or not predict information after the current time (in the future).

The energy information 40 may be transmitted/received as a true or false signal such as a Boolean signal on the network system, or may be transmitted/received as a real price. Alternatively, the energy information 40 may be transmitted/received by being divided into a plurality of levels.

The energy information 40 may be divided into time of use (TOU) information, critical peak pattern (CPP) information or real time pattern (RTP) information according to the change in the pattern of data with respect to time.

According to the TOU information, a data is changed step by step depending on time. According to the CPP information, a data is changed step by step or in real time depending on time, and emphasis is displayed at a specific point of time. According to RTP information, a data is changed in real time depending on time.

In a case where the energy information is time-based pricing information as an example, the time-based pricing information is changed. The time-based pricing information may be transmitted/received as a true or false signal such as a Boolean signal on the network system, or may be transmitted/received as a real price. Alternatively, the time-based pricing information may be transmitted/received by being divided into a plurality of levels.

In a case where the specific component 30 receives a true or false signal such as a Boolean signal, one signal may be recognized as an on-peak signal, and the other signal may be recognized as an off-peak signal.

Alternatively, the specific component 30 may recognize information on at least one drive, which contains the time-based information, and may recognize an on-peak or off-peak signal by comparing the value of the recognized information with the value of reference information.

For example, in a case where the specific component 30 recognizes information divided into levels or real pricing information, it recognizes an on-peak or off-peak signals by comparing the value of the recognized information with the value of reference information.

In this case, the value of the information on drive may be at least one of time-based pricing, electric energy, the variation of time-based pricing, the variation of electric energy, the average of time-based pricing and the average of electric energy. The value of reference information may be at least one of an average, the average between maximum and minimum values of power information during a predetermined period of time and the reference variation of power information during the predetermined period of time (e.g., the slope of consumed electric energy per unit time).

The value of reference information may be determined in real time or may be previously determined. The value of reference information may be determined on the UAN or may be determined on the HAN (a customer's direct input or an input from the energy management component, the central management component or the like).

In a case where the specific component 30 (e.g., the energy consumption component) recognizes an on-peak signal (e.g., at a point of time of recognition), an output may be determined as zero (stop or maintenance of a stop state) or may be decreased. If necessary, the output may be restored or increased. The driving scheme of the specific component may be previously determined before the specific component is operated, or may be changed when the specific component recognizes an on-peak signal posterior to the start of operation.

Alternatively, in a case where the specific component recognizes an on-peak signal (e.g., at a point of time of recognition), the output is maintained under an operable condition. In this case, the operable condition means that the value of the information on drive is less than a predetermined reference. The value of the information on drive may be time-based pricing, consumed electric energy, operation time, or the like. The predetermined reference may be a relative or absolute value.

The predetermined reference may be determined in real time or may be previously determined. The predetermined reference may be determined on the UAN or may be determined on the HAN (a customer's direct input or an input from the energy management component, the central management component or the like).

Alternatively, in a case where the specific component 30 recognizes high-cost information, the output of the specific component may be maintained or increased when the difference between a state information value and a reference value is within a predetermined range. For example, in a case where a compressor of a refrigerator is not operated in a low-cost section, the temperature of a cool chamber or freezing chamber is increased. Therefore, the compressor is necessarily turned on when the temperature of the cool chamber or freezing chamber approaches a reference temperature. In a case where a high-cost section comes after the compressor is turned on, the compressor maintains a current output when the difference between the temperature of the cool chamber or freezing chamber and the reference temperature is within a predetermined range. In a case where a user selects a button for cancelling power saving in the state that the specific component 30 recognizes the high-cost information, the output of the specific component may be maintained.

Alternatively, in a case where the specific component recognizes an on-peak signal (e.g., at a point of time of recognition), the output may be increased. However, although the output is increased at the point of time when the specific component recognizes the on-peak signal, the total output amount of the specific component during the entire drive period may be decreased or maintained as compared with that when the specific component is operated at a normal output level. Alternatively, although the output is increased at the point of time when the specific component recognizes the on-peak signal, the total consumed power or total time-based pricing of the specific component during the entire operation period may be decreased as compared that when the specific component is operated at a normal output level.

In a case where the specific component 30 recognizes an off-peak signal (e.g., at a point of time of recognition), the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output (change in the state of cool air that is a medium for performing the function of the refrigerator). In a case where the specific component is a washing machine or washer, hot water may be stored by driving a heater earlier than the time when the heater is to be operated (storage of hot water that is an additional medium for performing the function of the washing machine or washer). Alternatively, in a case where the specific component is a refrigerator, cool air may be stored in a separate supercooling chamber by increasing an output as compared with the existing output. Alternatively, in a case where the specific component recognizes an off-peak signal (e.g., at a point of time of recognition), electricity may be stored.

The curtailment information is information related to a mode in which the specific component is stopped or a small amount of time-based pricing is taken. As an example, the curtailment information may be transmitted/received as a true or false signal such as a Boolean signal on the network system.

If the specific component 30 recognizes curtailment information, the output may be determined as zero (stop or maintenance of a stop state) or may be decreased as described above.

The grid emergency information is information related to a power failure or the like. As an example, the grid emergency information may be transmitted/received as a true or false signal such as a Boolean signal on the network system. The information related to a power failure or the like has a relation with the reliability of a component using energy.

In a case where the specific component 30 recognizes grid emergency information, it may be immediately shut down.

The grid reliability information is information related to the supply amount of electricity supplied or information related to the quality of electricity. The grid reliability information may be transmitted/received as a true or false signal such as a Boolean signal on the network system, or may be determined by a component (e.g., an electric home appliance) through the frequency of AC power supplied to the component.

That is, if a frequency lower than the frequency of AC power supplied to the component is sensed, it may be determined that the amount of electricity supplied is small (information on the deficiency of the amount of electricity supplied). If a frequency higher than the frequency of AC power supplied to the component is sensed, it may be determined that the amount of electricity supplied is large (information on the excess of the amount of electricity supplied).

In a case where the specific component recognizes shortage of the amount of electricity or poor quality of electricity in the grid reliability information, an output may be determined as zero (stop or maintenance of a stop state) or may be decreased. If necessary, the output may be restored or increased.

On the other hand, in a case where the specific component recognizes the information on the excess of the amount of electricity supplied, the output may be increased, or the operation may be converted from an off-state to an on-state.

The energy increment information is information related to a state that surplus electricity is generated because the amount of electricity used by a component is less than that of power generation. As an example, the energy increment information may be transmitted/received as a true or false signal such as a Boolean signal on the network system.

In a case where the specific component 30 recognizes energy increment information, the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case where the specific component 30 is the energy storage component 13 or 23, the energy storage component 13 or 23 may store electricity by receiving the electricity supplied from the UAN, for example, when electricity storage cost is smaller than a predetermined value.

However, in a case where the energy storage component is connected to the energy generation component 21 that constitutes the HAN, it may continuously store energy generated by the energy generation component 21 until the electricity storage is completed. That is, the energy generated while the energy generation component 21 generates energy may be stored in the energy storage component 23.

The presence of completion of the electricity storage is determined while the energy storage component 13 or 23 stores electricity. In a case where the electricity storage is completed, the electricity supply for the electricity storage is cut off. Specifically, the presence of completion of the electricity storage may be determined using a sensor that senses the voltage, temperature or current of the energy storage component 13 or 23. The cutoff of the electricity supply may be performed using a switch (or circuit breaker) provided to a supply stage through which the electricity is supplied to the energy storage unit 13 or 23.

The electricity storage cost may be cost consumed in the electricity storage for a specific time period or electricity cost at a specific time.

As an example, in a case where the electricity storage cost is in an off-peak section (in a case where the specific component recognizes low-cost information which will be described later), the energy storage component 13 or 23 may store electricity. Alternatively, in a case where an on-peak section corresponds to an allowance section (in a case where the specific component recognizes high-cost information which will be described later), the energy storage component 13 or 23 may store in the on-peak section. In this instance, the allowance section is a section in which a power consumption information value is less than a predetermined reference. The power consumption information value may be a electricity cost, a power consumption amount, a time range, or the like. The predetermined reference may be a predetermined cost, a predetermined power consumption amount, a predetermined time, or the like. The predetermined reference may be a relative value or absolute value, and may be changed automatically or manually.

The energy storage component 13 or 23 may store a counter electromotive force generated when an energy consumption component that is rotatably operated or a motor provided to the energy consumption component is stopped (rotated).

Alternatively, the energy storage component 13 or 23 may store electricity using an energy consumption component that is rotatably operated or a motor provided to the energy consumption component. For example, in a case where the energy consumption component is a refrigerator, the energy storage component 13 or 23 may store electricity generated when a fan motor provided to the refrigerator is rotated (the fan motor may serve as a power generator or may be connected to the power generator). Alternatively, in a case where the energy consumption component is a washing machine, the energy storage component 13 or 23 may store electricity generated when a motor that rotates a drum for accommodating the laundry is rotated. In a case where the energy consumption component is a cooking appliance, the energy storage component 13 or 23 may store electricity generated when a motor for rotating a cooling fan is rotated. In a case where the energy consumption component is an air cleaner, the energy storage component 13 or 23 may store electricity generated when a motor for rotating a fan is rotated. That is, in this embodiment, in a case where a motor is provided regardless of the kind of the energy consumption component, the energy storage component 13 or 23 may store electricity generated when the motor is rotated. Alternatively, in a case where a power generator is connected to a fan rotated by the flow of air (natural flow or forcible flow), the energy storage component 13 or 23 may store electricity generated by the power generator.

The electricity stored in the energy component 13 or 23 may be supplied to one or more energy consumption components 26. In a case where electricity cost is higher than a reference value, the electricity stored in the energy component 13 or 23 may be supplied to the energy consumption component 26. As an example, in a case where the electricity cost is an on-peak (in a case where the specific component recognizes the high-cost information), the electricity stored in the energy storage component 13 or 23 may be supplied to the energy consumption component 26. In a case where the electricity cost is an off-peak (in a case where the specific component recognizes the low-cost information) but is close to the on-peak, the electricity stored in the energy storage component 13 or 21 may be supplied to the energy consumption component. If the electricity stored in the energy storage component 13 or 23 is less than a predetermined value, electricity generated in the energy generation component 11 is supplied to the energy consumption component. Thus, it is possible to prevent the operation of the energy consumption component from being stopped due to the cutoff of the electricity supply while the energy consumption component is operated.

In a case where the supply of electricity generated in the energy generation component 11 is cut off by interruption of electric power, the electricity stored in the energy component 13 or 23 may be supplied to the energy consumption component. In a case where the energy consumption component is an electric product, the electricity stored in the energy storage component 13 or 23 may be supplied to a communication unit or control unit provided to the electric product.

The electricity stored in the energy component 13 or may be supplied to a portion of a plurality of energy consumption components. As an example, the stored electricity may be supplied to an electric product such as a refrigerator required in continuous operation among a plurality of electric products. Alternatively, the stored electricity may be supplied to an energy consumption component with relatively low power among a plurality of energy consumption components that constitute one electric product. It will be apparent that the stored electricity is supplied to an energy consumption component with high power. Alternatively, when a course using a relatively small amount of power is performed among a plurality of courses in which an electric product is performed, the stored electricity may be supplied. It will be apparent that the stored electricity may be supplied even when a course using a large amount of power is performed.

Meanwhile, in a case where electricity is generated and stored by a fan or motor as described above, the electricity stored in the energy storage component 13 or 23 may be supplied to an energy consumption unit with relatively low power. As an example, the electricity stored in the energy storage component 13 or 23 may be supplied to an LED lamp, a display, a control unit, a communication unit, a low-power heater, or the like. Alternatively, in a case where the energy consumption component performs a plurality of courses, the electricity stored in the energy storage component 13 or 23 may be supplied to the energy consumption component in a course that requires low power.

The energy storage component 23 may be built in connected to one energy consumption component. Alternatively, a plurality of energy storage components 23 may be built in or connected to a plurality of energy consumption components, respectively. Alternatively, a plurality of energy storage components 23 may be built in or connected to one energy consumption component. The plurality of energy storage components 23 may be connected to one another to share the stored electricity.

Among the information related to energy, the on-peak information, the curtailment information and information on the deficiency of the amount of electricity supplied may be recognized as high-cost information considered that energy cost is relatively expensive. In this instance, the section in which the high-cost information is recognized by the specific component may referred to as a low-cost section.

On the other hand, among the information related to energy, the off-peak information, the energy increment information and the information on the excess of the amount of electricity supplied may be recognized as low-cost information considered that energy cost is relatively cheap. In this instance, the section in which the low-cost information is recognized by the specific component may be referred to as a low-cost section.

The information related to the fluctuation of the energy cost (high-cost or low-cost information) may be recognized as information for determining a power saving driving scheme of the specific component (e.g., the energy consumption component). That is, the information related to the fluctuation of the energy cost may be recognized by dividing a time slot (time period) based on energy cost or pricing period (pricing zone) for determining a driving scheme of the specific component into at least two or more.

A high period means a high price time period (period of high cost) or a high pricing period and a low period means a low price time period (period of low cost) and a low pricing period.

As an example, in a case where the information related to energy is recognized as a Boolean signal, the time slot (time period) based on energy cost or pricing period (pricing zone) for determining a driving scheme of the specific component may be divided into two. In a case where the information related to energy is divided into a plurality of levels or recognized as real-time information, the time period or pricing period may be divided into three or more.

Meanwhile, the information related to energy cost corresponding to at least time may be recognized as information for determining a power saving driving scheme of the specific component. That is, the information related to energy cost may be recognized by dividing a time slot (time period) or pricing zone (time period) into at least two or more. As described above, the divided time period or pricing period may be determined based on the kinds of the recognized information (the Boolean signal, the plurality of levels and the real-time information).

In other words, the information related to fluctuation of energy cost may be recognized by dividing a determination factor for driving the specific component into two or more, and functions on time and energy cost may be included in the determination factor.

In a case where the information related to energy cost is divided into two levels or more, the driving scheme of the specific component may be determined according to the information divided into levels.

On the other hand, in a case where the recognized information related to energy cost is not divided based on a specific reference (e.g., real-time cost information), it is compared with predetermined information, and the driving scheme of the specific component may be determined based on the compared result.

Here, the predetermined information may be reference information (e.g. reference value) for dividing the information related to energy cost, and the compared result may be whether not the information related to energy cost is more or less than the reference value.

Specifically, each of the kinds of information related to energy may be divided into first information 41 that is raw information, second information 42 that is refined information, and third information 43 that is information for performing the function of the specific component. That is, the first information is a raw data, the second information is a refined data, and the third information is a command for performing the function of the specific component.

The information related to energy is included a signal, and the signal is transmitted. In this instance, one or more of the first to third information may be transmitted several times while the content of the information is not converted but only the signal including the information is converted.

For example, as shown in FIG. 3, a component that receives a signal including the first information may convert only the signal and transmit a new signal including the first information to another component.

Therefore, it is described in this embodiment that the conversion of signal is a different concept from the conversion of information. In this instance, it can be readily understood that when the first information is converted into the second information, the signal including the first information is also converted into the signal including the second information.

However, the third information may be transmitted several times in the state that the content of the third information is converted or in the state that only the signal including the third information is converted while the content of the third information is identically maintained.

Specifically, in a case where the first information is raw information on time-based pricing, the second information may be refined information on the time-based pricing. The refined information on the time-based pricing is information in which the time-based pricing is divided into a plurality of levels or analysis information. The third information is a command generated based on the second information.

The specific component may generate, transmit or receive one or more of the first to third information. The first to third information are not necessarily transmitted or received in sequence. Only a plurality of pieces of third information without the first and second information may be transmitted in sequence or parallel. Alternatively, the first and third information may be transmitted or received together, the second and third information may be transmitted or received together, or the first and second information may be transmitted or received together.

As an example, in a case where the specific component receives the first information, it may transmit the second information or may transmit the second and third information.

In a case where the specific information receives only the third information, it may generate and transmit new third information.

Meanwhile, in the relation between two pieces of information, one is a message and the other is a response for the message. Thus, each of the components that constitute the network system may transmit or receive a message. In a case where each of the components receives a message, it may respond to the message. Therefore, in the case of an individual component, the transmission of a message is a relative concept with the response for the message.

The message may include a data (first or second information) and/or a command (third information).

The command (third information) may include a command for storing the data, a command for generating the data, a command for processing the data (including the generation of an additional data), a command for generating an additional command, a command for transmitting the additionally generated command, a command for transmitting a received command, and the like.

In this specification, the response for the received message means storage of the data, processing of the data (including generation of an additional data), generation of a new command, transmission of the newly generated command, simple transmission of a received command (including generation of a command for transmitting the received command to another component), operation, transmission of the stored information, transmission of an acknowledge message (acknowledge character or negative acknowledge character), or the like.

For example, in a case where the message is first information, the specific component that receives the first information may generate second information by processing the first information, or may generate the second information and new third information, as a response for the message.

The specific component that receives the message may provide a response related to energy. Here, the term "response" may be understood as a concept including an operation through which the specific component can perform a function. As an example, the HAN 20 may perform an operation related to energy by receiving a message.

The response (operation) related to energy, provided by the specific component, will be described in detail. For example, the specific component may be an energy consumption component.

The energy consumption component may be driven so that the energy cost when it is driven based on the recognition for energy information is reduced as compared with that when it is driven without the recognition for energy information.

The specific component may include a plurality of modes in which it is driven to perform its own function. The plurality of modes are a first mode and a second mode in which energy cost is relatively saved as compared with that in the first mode. The specific component may be driven in at least one of the first and second modes.

Here, the first mode may be a general mode and the second mode may be a power saving mode. Alternatively, the first and second modes may all be power saving modes.

The general mode may be understood as a mode in which the function of the specific component is performed without recognition of energy information. On the other hand, the power saving mode may be understood as a mode in which the function of the specific component is performed based on the recognition of energy information so as to save energy cost.

In a case where the first and second modes are power saving modes, the first mode may be specified as a driving scheme for saving energy cost and the second mode may be specified as a driving scheme in which the energy cost in the second mode is more saved than that in the first mode.

Meanwhile, in a case where the specific component (e.g., the energy consumption component) is driven, at least a portion is recognized in a driving scheme including at least drive time and course. In this case, an unrecognized portion may be generated so as to save energy cost, and a recognized portion may be converted into another scheme.

For example, at least a portion of the driving scheme may be recognized under the control of the energy management component, the control of the energy consumption component, or the like. In a case where a specific driving scheme is further required so as to save energy cost, an unrecognized portion of the driving scheme may be newly generated, and a recognized portion may be converted into another scheme so as to save energy.

It will be apparent that the process of generating the unrecognized portion may be omitted. In this case, the process of converting the recognized portion into another scheme. On the other hand, the process of converting the recognized portion into another scheme may be omitted. In this case, the process of newly generating the unrecognized portion may be performed.

The drive time may include a drive start time or drive end time. The course may include a drive period of the specific component and the power of the specific component.

The generated scheme or converted scheme may be a scheme recommended by the specific component so as to save energy cost. Here, the specific component may be an energy consumption component (control component) or the energy management component.

As an example, in a case where the recognized scheme is a specific drive time, the specific drive time may be converted into another time so as to save energy cost, and a specific course may be generated.

On the other hand, in a case where the recognized scheme is a specific course, the specific course may be converted into another course so as to save energy cost, and a specific time may be generated.

Under the control described above, a change in time or power may be made with respect to the output function of the specific component based on time.

The generated scheme or converted scheme may be performed within a set range. That is, in the process of recognizing at least a portion of the driving scheme, the generation or conversion of the driving scheme may be performed within a predetermined reference in which the recognized portion appears (e.g., restriction set by a user, constraint set under the control of the energy management component or energy consumption component, or the like).

Therefore, in a case where the set range is out of the predetermined reference, it is restricted to generate the unrecognized portion or to convert the recognized portion into another scheme.

Another embodiment is proposed.

Cost information may further included in the recognized driving scheme. That is, in a case where the cost information is recognized, a portion related to the drive time or course may be generated. The generated driving scheme may be recommended.

Meanwhile, a response of the specific component based on the information related to the fluctuation of the energy cost (high-cost or low-cost information), e.g., a power control for power saving driving, may be performed. An output decrease (including an output of zero) or output increase may be included in the output control.

It is as described above that the output is decreased or zero, maintained or increased based on the recognition for the information (on-peak or off-peak) related to energy cost.

If high-cost information is recognized, the output may be zero or decreased. Specifically, the output in the recognition of the high-cost information may be decreased as compared with that in the recognition of low-cost information. As described above, the decrease of the output may be previously determined before the specific component is operated, or may be changed when the high-cost information is recognized posterior to the start of the operation of the specific component.

In a case where the output of the specific component is zero or decreased, the function to be performed by the specific component may be lost as compared with a normal case. Therefore, a response for restoring the lost function may be performed.

As an example, after the output of the specific component is decreased, the specific component may be controlled so that the total operation time of the specific component is increased or so that the output is increased in at least a time period.

In other words, if specific reference information related to energy information is recognized in a period after the output of the specific component is controlled, the response for controlling the output may be released. Here, the term "period" may be divided based on a point of time when the high-cost information is recognized.

The total operation time may be understood as a time approaching a specific target in the process of performing the function of the specific component. As an example, in a case where the specific component is an electric appliance (washing machine, drying machine, cooking appliance or the like) intermittently driven (or driven in a specific course), the total operation time may be understood as a time until a corresponding course is completed.

On the other hand, in a case where the specific component is an electric appliance (refrigerator, water purifier, or the like) driven at normal times, the total operation time may be understood as a time approaching a target set for performing the function of the specific component. For example, the set target may be a target temperature, a target amount of ice produced, or a target amount of clean water in the refrigerator.

The total operation time may be increased as compared with the operation time set before the output of the specific component is decreased. In a case where the output of the specific component is not decreased, the total operation time may be increased as compared with the operation time of the specific component. However, although the total operation time of the specific component is increased, the specific component is controlled so that the total energy cost generated through the drive of the specific component can be saved as compared with that when the output of the specific component is not decreased.

If the high-cost information is recognized, the output of the specific component may be increased.

However, although the output is increased at a point of time when the high-cost information is recognized, the total output of the specific component during the entire driving period may be decreased or maintained as compared with that when the specific component is operated under a normal output. Alternatively, although the output is increased at a point of time when the high-cost information is recognized, the total power consumption or total time-based pricing of the specific component during the entire driving period may be decreased as compared with that when the specific component is operated under the normal output.

If the low-cost information is recognized, the output of the specific component may be increased. For example, in a case where the operation reservation of the specific component is set up, the driving of the specific component may be started before the setup time, or a component having a large output in a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case of a specific condition (additional condition) is generated based on the information related to the fluctuation of the energy cost (high-cost or low-cost information), the response of the specific component, e.g., the output control for power saving driving, may be limited. That is, the output of the specific component may be maintained.

Here, the term "limitation" may be understood as the release of the output control performed or not performed.

The specific condition includes a case where influence on energy cost is minute even though the output control of the specific component is not performed or a case where it is necessary to prevent a function to be performed by the specific component from being degraded when the output of the specific component is controlled.

Whether or not the influence on the energy cost is minute may be determined based on a predetermined reference (time-based pricing, power consumption or information on operation time). The predetermined reference may be a relative or absolute value.

The case where the function to be performed by the specific component is degraded may be considered as a case where the specific component is a defrosting heater, for example.

In a case where it is controlled to decrease the output in a high-cost time period and to increase the output in the low-cost time period, the driving of the defrosting heater is more frequently performed than that during a normal time (setup period). In this case, the temperature of a storage room in the refrigerator is increased, and thus, the control of the output can be limited.

On the other hand, the component 30 may include a display unit 31 for displaying information. The display unit 31 may be detachably connected to or fastened to the component 30. When the display unit 31 is detachable from the component 30, the display unit 31 may perform a wired/wireless communication with the component 30, and more particularly, with a controller of the component 30. However, when the display unit 31 is fastened to the component 30, the display unit 31 may performed the wire/wireless communication with the component 30.

When the display unit 31 is detachable from the component 30, there may be provided a communication unit and an input part for inputting or selecting information on the display unit 31. Accordingly, while the display unit 31 is being separated from the component 30, information may be inputted or selected via the input part. However, the component 30 may include a communication unit, and only the display unit 31 may be separated from the component 30. The display unit 31 may be one of the energy management component 24, the energy metering component 25, and the central management component 27 and may be an additional controller.

When the display unit 31 includes the communication unit, the component 30 may include the communication unit. When the display unit 31 and the component 30 may communicate with each other and may transmit and receive information using communication signals, it is possible to use the display unit 31. In other words, the display unit 31 is in a phase of being available when there is provided signal strength allowing a communication signal to include information therein. On the contrary, the display unit 31 is in a phase of being impossible to be used when the display unit 31 cannot communicate with the component 30 or signal strength is weak in such a way that a communication signal cannot include information. One of the display unit 31 and the component 30 transmits a communication signal and another thereof transmits a response signal. According to whether receiving the communication signal and response signal and to the signal strength, it may be determined whether to use the display unit 31. That is, when one of the display unit 31 and the component 30 cannot receives a signal or signal strength of the received signal is lower than reference strength, it may be determined to be impossible to use. Strength of a transmitted signal may be increased till any one of the display unit 31 and the component 30 receives a response signal with strength higher than the reference strength.

Also, on one of the display unit 31 and the component 30, there is displayed information notifying of whether the display unit 31 is available. When it is recognized that the display unit 31 is not available, the component 30 may be controlled to increase unique performance thereof, perform a door-locking function, and be limited in operation. Also, power of the component 30 may be turned off while allowing a communication unit such as a modem needed in communication in the network system to be turned on. Otherwise, while maintaining a memory function for storing information on a phase of the component 30, the power of the component 30 may be turned off.

Meanwhile, the display unit 31 and the component 30 may include sensors, respectively, to sense whether the display unit 31 is mounted thereon. It may be checked while the component 30 is being operated that the display unit 31 is mounted thereon. The respective sensors may be vibration sensors for sensing a vibration. When the display unit 31 is mounted on the component 30, a vibration occurring while the component 30 is being operated may be transferred to the display unit 31. Thus, when a difference between vibration values sensed by the respective sensors is smaller than a certain value, it is possible to recognize the display unit 31 as being mounted on the component 30. When it is determined that the display unit 31 is being mounted on the component 30, the operation of the component 30 may be controlled to reduce a vibration or noise occurring while operating the component 30.

As an example, when the component 30 is one of a washing machine or a drying machine, rotation speed of a motor thereof may be reduced. Also, when the component 30 is a refrigerator, a driving cycle of a compressor thereof may be reduced. On the contrary, when it is recognized that the display unit 31 is separated from the component 30, the component 30 may be controlled to increase unique performance thereof, perform a door-locking function, or be limited in operation. As another example, the respective sensors may be temperature sensors. Also, when a difference between numerical values of temperatures sensed by the respective sensors is smaller than a certain value, it is possible to recognize the display unit 31 as being mounted on the component 30.

In a phase when the display unit 31 is separated from the component 30, the component 30 may include an auxiliary display unit to allow the component 30 to be operated. Whether to operate the auxiliary display unit may be determined depending on whether the display unit 31 is available. As an example, when the display unit 31 is separated from the component 30 or not available, the auxiliary display unit may be turned on.

Figure 4:
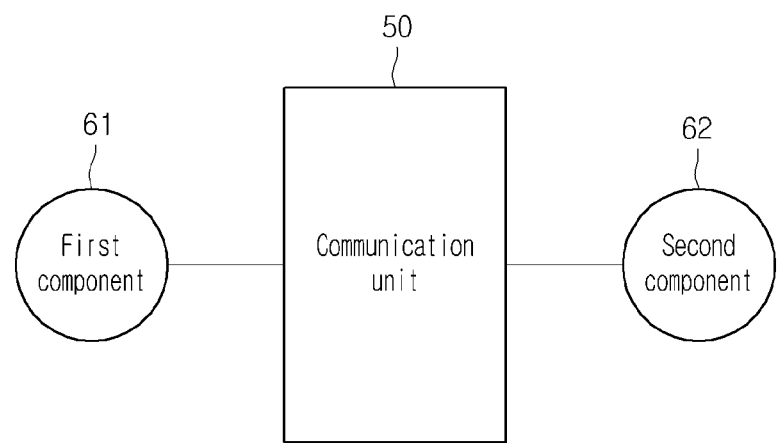
FIG. 4 is a view showing the communication structure of two components that constitute the network system according to a first embodiment.
Figure 5:
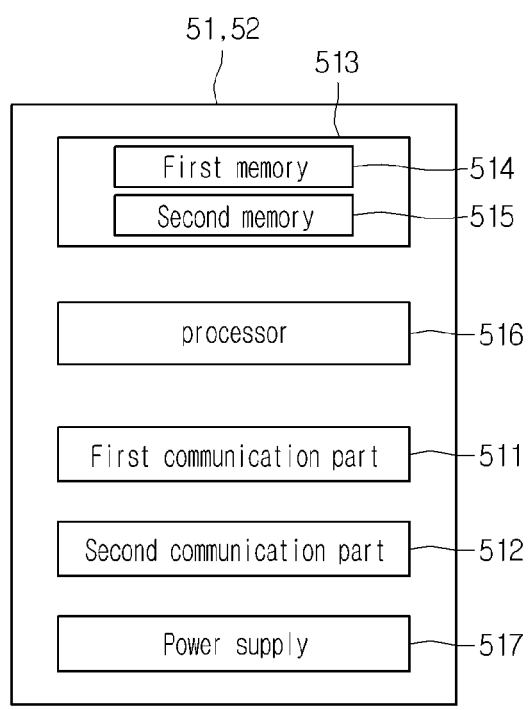
FIG. 5 is a block diagram showing the detailed configuration of a communication device that constitutes a communication unit.

FIG. 4 is a view showing the communication structure of two components that constitute the network system according to a first embodiment. FIG. 5 is a block diagram showing the detailed configuration of a communication device that constitutes a communication unit.

Referring to FIGS. 2, 4 and 5, first and second component 61 and 62 that constitute the network system may perform wired or wireless communication by means of a communication unit 50. The first and second components 61 and 62 may perform unidirectional or bidirectional communication.

In a case where the two components 61 and 62 perform wired communication, the communication unit 50 may be a simple communication line or power line communication means. It will be apparent that the power line communication means may include communicators (e.g., a modem or the like) respectively connected to the two components.

In a case where the two components 61 and 62 perform wireless communication, the communication unit 50 may include a first communicator 51 connected to the first component 61 and a second communicator 52 connected to the second component 62. In this case, the first and second communicators 51 and 52 perform wireless communication with each other.

As an example, if any one of the first and second comunicators is powered on, one of the two communicators may transmit a network participation request signal, and the other of the two communicators may transmit a permission signal. As another example, if any one of the first and second comunicators is powered on, the powered-on communicator may transmit a network participation request signal to a communicator previously participated in the network, and the communicator that receives the request signal may transmit a permission signal to the powered-on communicator.

In a case where a communicator that recognizes energy information determines that an error occurs in the received information in the state that a specific component participates in the network, the information is re-requested. For example, in a case where the first communicator receives energy information from the second communicator but an error occurs in the received information, the first communicator may request the second communicator to re-transmit the energy information. If the first communicator does not receive normal information for a predetermined time or number of times, it is determined that the first communicator has an error. In this case, information for informing a user of the error may be displayed in the first communicator or the first component 61.

The first component 61 may be a component that constitutes the UAN 10 or a component that constitutes the HAN 20.

The second component 62 may be a component that constitutes the UAN 10 or a component that constitutes the HAN 20.

The first and second components 61 and 62 may be the same kind of component or different kinds of components.

Components may be joined in the UAN 10 or the HAN 20.

Specifically, addresses may be assigned to a plurality of components, e.g., first and second components, respectively. Here, the addresses are necessary for performing communication between the components and can be mapped to at least a group.

The address may be understood as values respectively converted from the unique code of the first or second component. That is, at least a portion of the components that constitute the network system may have an unchangeable/unique code, and the code may be converted into an address for building a network.

In other words, product codes for at least some of the plurality of components capable of constituting first and second networks may be converted into different network codes based on the constituted networks.

As an example, the product code may be a unique code determined in production of electric appliances or a code separately provided for the registration of a network. The product code may be converted into an identity (ID) for identifying a network to which the electric appliance is to be registered.

The first and second networks may be networks that constitute the UAN 10 or networks that constitute the HAN 20. On the other hand, the first and second networks may be the UAN 10 and the HAN 20, respectively. Alternatively, the first and second networks may be the HAN 20 and the UAN 10, respectively.

A first component and a second component for allowing the first component to participate in the network may be included in the plurality of components that constitute the network. For example, the first component may be an electric appliance and the second component may be a server.

Any one of the first and second components transmits a request signal for participating in the network, and the other of the first and second components may transmit a permission signal.

That is, a signal may be transmitted/received between the first and second components, and whether or not to participate in the network may be determined based on the transmission time or number of the signal.

As an example, the first component transmits a test signal to the second component, and it is determined whether or not a response signal from the second component is transmitted to the first component. In a case where the response signal is not transmitted, the first component re-transmits the test signal, and it is re-determined whether or not a response signal from the second component is transmitted to the first component. By repeating such a process, if the transmission number of the test signal exceeds the setting number of the test signal, it may be determined that the second component does not participate in the network.

Meanwhile, the first component may transmit the test signal to the second component. If a response signal from the second component is not transmitted within a setup time, it may be determined that the second component does not participate in the network.

The first and second communicators 51 and 52 may have the same structure. Hereinafter, the first and second communicators 51 and 52 will be referred to as a communicator 51 and 52.

The communicator 51 and 52 may include a first communication part 511 for communication with the first component 61, a second communication part 512 for communication with the second component 62, a memory 513 for storing information received from the first component 61 and information received from the second component 62, a processor 516 for performing information processing, and a power supply 517 for supplying power to the communicator 51 and 52.

Specifically, the communication language (or scheme) of the first communication part 511 may be identical to or different from that of the second communication part 512.

Two kinds of information respectively received from the two components may be stored in the memory 513. The two kinds of information may be stored in a single sector or may be respectively stored in sectors. In any case, an area in which the information received from the first component 61 may be referred to as a first memory 514, and an area in which the information received from the second component 62 may be referred to as a second memory 515.

The processor 516 may generate first information or generate second and third information based on information received from the component or another communicator.

As an example, in a case where the communicator 51 and 52 receives the first information, it may generate information or sequentially generate the information and the second information by processing a data. Alternatively, in a case where the communicator 51 and 52 receives the first information, it may generate the second and third information by processing a data. In a case where the communicator 51 and 52 receives the third information, it may new third information.

For example, in a case where the second component is an energy consumption component (electric home appliance, component that constitutes the electric home appliance, or the like), the second communicator may generate a command for reducing energy consumption. In a case where the second component is an energy generation component, energy distribution component or energy storage component, the second communicator 52 may generate a command for energy generation time, generation amount, energy distribution time, distribution amount, energy storage time, storage amount or the like. In this case, the second communicator 52 serves as an energy management component.

The power supply 517 may receive electricity supplied from the components 61 and 62 or may receive electricity supplied from a separate power source. Alternatively, the power supply 517 may be a battery or the like.

Figure 6:
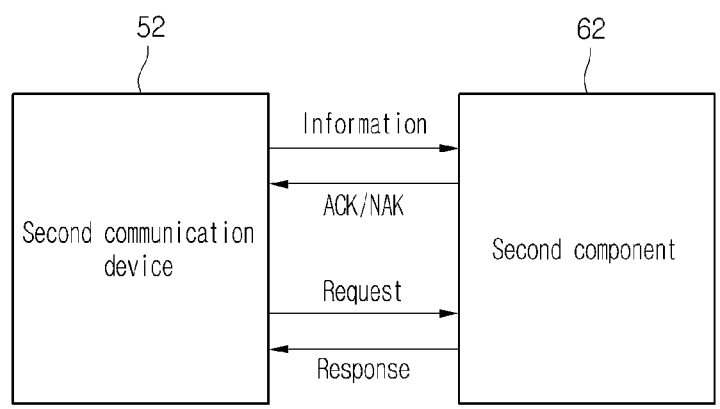
FIG. 6 is a view showing a communication performing process between a specific component and a communication device according to the first embodiment.

FIG. 6 is a view showing a communication performing process between a specific component and a communication device according to the first embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 6, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

The information received from the first communicator is stored in the memory 513. The second communicator 52 transmits a message to the second component 62 as a response for the message. In this instance, the message transmitted to the second component 62 relates to new information different from the information previously stored in the memory 513, or information generated in the processor 516.

Then, the second component 62 transmits an acknowledge character (ack) or negative acknowledge character (Nak) to the second communicator 52 as a response for the message. The second component 62 performs a function (generation of a command, operation, or the like) based on the received information, or waits for performing the function.

Meanwhile, the second communicator 52 requests component information to the second component 62 in real time or by periods. As an example, the component information may be component state information or information on a component unique code, a manufacturer, a service name code, an electricity use amount, and the like. Then, the second component 62 transmits component information to the second communicator 52 as a response for the request. The component information is stored in the memory 513 of the second communicator 52.

If the second communicator 52 receives a message for requesting the component information from the first communicator 51, it transmits the component information stored in the memory 513 to the first communicator 51 as a response for the message. Alternatively, the second communicator 52 transmits the component information stored in the memory 513 to the first communicator 51 in real time or by periods.

The second communicator 52 may transmit the information of the first component, stored in the memory, to the first component together with the information received from the first component. Alternatively, the second communicator 52 may transmit the information of the first component, stored in the memory, to the first component, separately from transmitting the information received from the first component.

The second communicator 52 stores the information of the second component 62 in the memory 513. Hence, in a case where the second communicator 52 receives a message for requesting the component information from the first communicator 51, it transmits the component information stored in the memory 513 directly to the first communicator 51 without a request for information to the second component 62, and thus, the communication load of the second component 62 can be reduced. That is, the second component becomes a virtual component.

Figure 7:
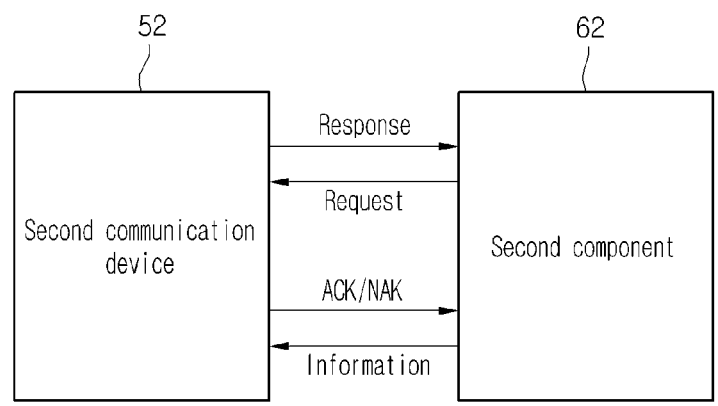
FIG. 7 is a view showing a communication performing process between a specific component and a communication device according to a second embodiment.

FIG. 7 is a view showing a communication performing process between a specific component and a communication device according to a second embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 7, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

If the second communicator 52 receives a message for requesting information from the second component 62, it transmits a message to the second component 62 as a response for the message for requesting the information. In this instance, the message transmitted to the second component 62 relates to new information different from the information previously stored in the memory 513, or information generated in the processor 516. Alternatively, the information transmitted to the second component 62 may be information received from the first component.

The second component 62 performs a function based on the received information or waits for performing the function.

Meanwhile, the second component 62 transmits component information to the second component 62 in real time or by periods. As an example, the component information may be component state information or information on a component unique code, a manufacturer, a service name code, an electricity use amount, and the like.

As described above, the electric use amount may be detected by the smart meter. In a case where the electricity use amount is included in the information of the second component 62, the correction of an actual electricity use amount may be performed by comparing the information of the second component 62 with the information of the smart meter.

Then, the second communicator 52 stores the information of the second component 62 in the memory 513, and transmits an acknowledge character (ack) or negative acknowledge character (Nak) to the second component 62 as a response for the message.

If the second communicator 52 receives a message for requesting component information from the first communicator 51, it transmits the information of the second component 62, stored in the memory 513, to the first communicator 51 as a response for the message. Alternatively, the second communicator 52 the information of the second component 62, stored in the memory 513, to the first communicator 51 in real time or by periods.

The second communicator 52 stores the information of the second component 62 in the memory 513. Hence, in a case where the second communicator 52 receives the message for requesting the component information from the first communicator 51, it transmits the information stored in the memory 513 directly to the first communicator 51 without transmitting a request for information to the second component 62, and thus, the communication load of the second component 62 can be reduced. That is, the second communicator 52 becomes a virtual component.

<Applications>

In the following descriptions, the first and second components may be reversed to each other, and therefore, overlapping descriptions will be omitted. For example, in a case where the first component is an electric home appliance and the second component is an energy management component, description in a case where the first component is an energy management component and the second component is an electric home appliance will be omitted.

Information transmitted/received by each of the components may be all the information described above. Particularly, specific information may be transmitted/received for each of the components.

The energy generation components 11 and 21 may transmit/receive information related to energy generation amount, and the like. The energy distribution components 12 and 22 may transmit/receive information related to energy distribution amount, distribution time, and the like. The energy storage components 13 and 23 may transmit/receive information related to energy storage amount, storage time, and the like. The energy metering components 15 and 25 may transmit/receive information related to energy consumption amount, and the like. The energy management components 14 and 24 may transmit/receive information related to energy generation, distribution, storage, consumption, cost, reliability, emergency situation, and the like.

(1) Case where Second Component is One Component of HAN

The second component 62 may be an energy consumption component 26, e.g., a heater, motor, compressor, display or the like. In this case, the first component 61 may be a MICOM or energy consumption component 26 as an example. The MICOM or energy consumption component 26 may transmit a message for reducing energy consumption to another energy consumption component 26. Then, the another energy consumption component 26 may perform an operation for reducing energy, for example.

As another example, the energy consumption component 26 may be an electric home appliance. In this case, the first component 61 may be an energy storage component 23, an energy consumption component 26 (electric home appliance), an energy management component 24, an energy metering component 25, a central management component 27, a web server component 28, or a component that constitutes the UAN 10.

In this instance, an energy management function may be included or not included in the first component 61 except the energy management component 24.

In a case where an energy management function or solution is not included in the first component 61, it may be included in the communication unit or may be included in the MICOM of the second component 62. In this case, the energy management function is related to the consumption of energy.

As still another example, the second component 62 may be an energy generation component 21, an energy distribution component 22 or an energy storage component 23. In this case, the first component 61 may be an energy management component 24, a central management component 27, a web server component 28 or a component that constitutes the UAN 10.

A message may be transmitted to the second component 62. Here, the message may include energy generation time, generation amount or the like, energy distribution time, distribution amount or the like, and energy storage time, storage amount or the like.

In this instance, an energy management function may be included or not included in the first component 61 except the energy management component 24.

In a case where an energy management function or solution is not included in the first component 61, it may be included in the communication unit. In this case, the energy management function is related to the generation, distribution and storage of energy.

As still another example, the second component may be an energy metering component 25. In this case, the first component 61 may be a central management component 27, a web server component 28 or a component that constitutes the UAN 10.

An energy management function may be included or not included in the energy metering component. In a case where the energy management function is included in the energy metering component 25, the energy metering component 25 performs the same operation as the EMS.

In a case where an energy management function or solution is included in the energy metering component 25, it may be included in the communication unit or may be included in the second component 62.

As still another example, the second component 62 may be a central management component 27. In this case, the first component 61 may be a web server component 28 or a component that constitutes the UAN 10.

(2) Case where Second Component is One Component of UAN

The first component 61 may be a component that constitutes the UAN 10. In this case, the first and second components 61 and 62 may be the same kind of component or different kinds of components.

An energy management function may be included in the first component 61, the second component 62 or the communication unit.

The energy management function included in a specific component or the energy management function included in the energy management component 14 may be related to generation amount, distribution amount, storage amount, energy use amount of a component that constitutes the HAN 20.

In this specification, an example capable of constituting the network system has been described. However, any component not mentioned in this specification may be a first or second component that performs communication through the communication unit. For example, an automobile may be a second component, and the energy management component 24 may be a first component.

(3) Case where One of First and Second Components Communicates with Third Component Although the communication between two components has been described in the aforementioned examples, each of the first and second components may perform communication with one or more components (a third component to an n-th component).

In this case, the relation of the first or second component that performs communication with the third component and the like may be one of the aforementioned examples.

For example, the first component may be a component that constitutes the UAN, the second component may be an energy management component 24 that communicates with the first component, and the third component may be an energy consumption component 26 that communicates with the second component. In this instance, one or more of the three components may communicate with another component.

In this specification, the first to n-th components may be components that constitute the UAN or components that constitute the HAN. Alternatively, a portion of the components may be components that constitute the UAN, or another portion of the components may be components that constitute the HAN.

Hereinafter, third and fourth embodiments will be described. A difference between these embodiments and the aforementioned embodiments will be mainly described, and descriptions and reference numerals will be quoted to elements of these embodiments identical to those of the aforementioned embodiments.

Figure 8:
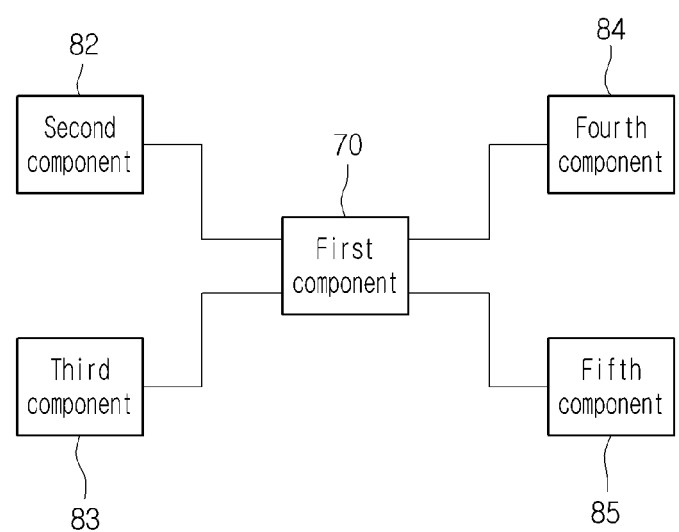
FIG. 8 is a view showing the communication structure of components that constitute the network system according to a third embodiment.
Figure 9:
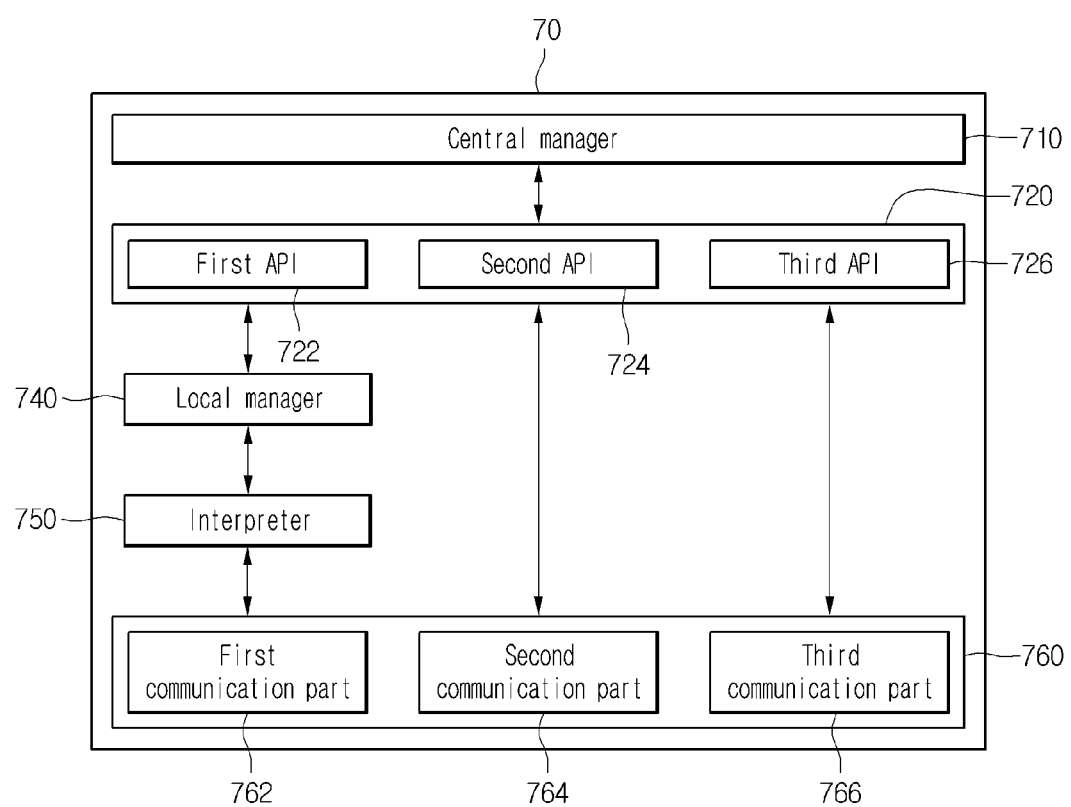
FIG. 9 is a block diagram showing the detailed configuration of a first component in FIG. 8.

FIG. 8 is a view showing the communication structure of components that constitute the network system according to a third embodiment. FIG. 9 is a block diagram showing the detailed configuration of a first component in FIG. 8.

Referring to FIGS. 8 and 9, a first component 70 may communicate with second to fifth components 82, 83, 84 and 85. Hereinafter, it will be described as an example that the first component 70 is a central management component (home server), the second and third components 82 and 83 are energy consumption components (electric home appliances), the fourth component 84 is an energy metering component (smart meter), and the fifth component 85 is a component that constitutes the UAN. The components may communicate with each other by means of a communication unit. In the network system illustrated in FIG. 8, each of the components is directly connected to the first component 70 to communicate with the first component 70. However, in a case where each of the components 82, 83, 84 and 85 is connected to new components to communicate with the new components, the network system may be extended and operated by the new components.

The second and third components 82 and 83 may be the same kind of component or different kinds of components. In this embodiment, it will be described as an example that the second and third components 82 and 83 are different kinds of energy consumption components.

The first component 70 may simply transmit information received from the fourth component 84 and/or the fifth component 85 to the second component 82 and/or the third component 83, or may process the received information and transmit the processed information.

The first component 70 may simply transmit information received from the second component 82 and/or the third component 83 to the fourth component 84 and/or the fifth component 85 (a signal may be converted), or may process the received information and transmit the processed information (the information is converted.

The first component 70 includes a communication unit 760 for performing communication with another component, a central manager 710 for managing the entire operation and/or information processing of the first component, and an application programming interface 720 (hereinafter, referred to as an API) for performing an interface between the communication unit 760 and the central manager 710 (specifically, application software).

The communication unit 760 includes a first communication part 762 for performing communication with the second and third components 82 and 83, a second communication part 764 for performing communication with the fourth component 84, and a third communication part 766 for performing communication with the fifth component 85.

In this instance, the first and second communication parts 762 and 764 may use different communication protocols from each other. As an example, the first communication part 762 may use Zigbee and the second communication part 764 may use Wi-fi. In this embodiment, the kind of communication protocol or method used by the first and second communication parts 762 and 764 is not limited. The third communication component 766 may use Internet communication as an example.

The API 720 includes a first API 722, a second API 724 and a third API 726. The third API 726 is an interface between the central manager 710 and the third communication part 766, and the first API 722 is an interface between the first communication part 762 and the central manager 710. The second API 724 is an interface between the second communication part 762 and the central manager 710.

The first component 70 further includes a local manager 740 and an interpreter 750. In a case where the information to be transmitted/received between the API 720 and the communication unit 760 is information related to operations of energy consumption components (electric home appliances), the local manager 740 outputs information corresponding to the respective energy consumption components. The interpreter 750 interprets information transmitted from the local manager 740 to the communication unit 760 or information received in the communication unit 760. The information outputted from the interpreter 750 is used to set or get values of information related to the respective energy consumption components.

The local manager 740 includes a memory (not shown) in which information related to one or more energy consumption components is stored. Alternatively, the local manager 740 may be connected to a memory in which information related to one or more energy consumption components is stored. The information related to each of the energy consumption components may include operation information of each of the energy consumption components and information for controlling the energy consumption components. The information related to each of the energy consumption components may further include software download information for operating each of the energy consumption components and information for remote controlling/monitoring.

As an example, in a case where a plurality of energy consumption components include a washing machine, a refrigerator and a cooking appliance, information related to each of the energy consumption components is stored in the memory. The information related to each of the energy consumption components may be changed as components connected to the network system are changed.

If a signal is transmitted from the API 720 to the local manager 740, information corresponding to a specific energy consumption component is outputted. In a case where a plurality of energy consumption components exist, information on the plurality of energy consumption components is outputted. The interpreter 750 interprets the information transmitted from the local manager 740 into a machine language so as to transmit the information to the energy consumption components. The machine language may be a signal used to set or get the operation information of the energy consumption components.

The information transmission process in the first component 70 will be described.

As an example, the first component 70 may receive energy information (e.g., an energy reduction signal: first command) from the forth component 45 through the second communication part 764. The received energy information is transmitted to the central manager 710 through the second API 724. In the process of information transmission between the second API 724 and the central manager 710, only a signal including the information is converted, and the content of the information is not converted.

Since the energy information is information related to the energy consumption reduction of the energy consumption components, the central manager 710 transmits information (second command) related to operations of the energy consumption components to the API 720. As an example, the central manager 710 transmits information necessary for turning off power of the washing machine or refrigerator.

Then, the information is transmitted from the first API 722 to the local manager 740.

The local manager 740 transmits information (third command) for controlling the operation of each of the energy consumption components to the interpreter 750 based on the information transmitted from the first API 722. As an example, in a case where the information transmitted from the first API 722 is information having different kinds of energy consumption components as targets, the local manager 740 transmits information related to the control of each of the energy consumption components to the interpreter 750. In this case, since the local manager 740 receives the second command and outputs the third command, the information inputted to the local manager 740 is converted and outputted by the local manager 740.

Subsequently, the interpreter 750 interprets the information transmitted from the local manager 740 into a machine language (signal). Then, the converted signal is transmitted to the target energy consumption components (second and third components) through the first communication part 762. Then, the energy consumption components (second and third components) are finally turned off so as to reduce energy.

Although it has been described above that the first component receives information through the second communication part, the first component may receive information through the third component so that the information related to the energy consumption components is outputted.

Meanwhile, the second and third components 82 and 83 may transmit their own operation information to the first component 70. Since the information transmitted from the second and third components 82 and 83 is information related to operations of the energy consumption components, the signal received in the first communication part 762 is transmitted to the central manager 710 via the interpreter 750, the local manager 760 and the first API 722. In such an information transmission process, the information related to the second and third components 82 and 83 is stored in the local manager 740. In this embodiment, since the information related to the energy consumption components is stored in the local manager, the local manager may be understood as a virtual energy consumption component (abstraction model).

The central manager 710 may transmit the received information to the second communication part 764 and/or the third communication part 766.

The operation of the first component will be described. The information received through the communication unit 760 may be transmitted directly to the API 720, or may be converted (via the interpreter and the local manager) and then transmitted to the API 720, based on the kind of information (or the type of signal).

The information transmitted from the central manager 740 may be transmitted directly to the communication unit 760, or may be converted and then transmitted to the communication unit 760.

As another example, the interpreter may be included in the local manager 740, and the information received through the communication unit 760 is transmitted to the local manager 740. However, converted information may be outputted, or information may be outputted as it is without converting the information.

Meanwhile, in a case where the information transmitted to the API 720 through the second or third communication part 764 or 766 is information (raw data or refined data) related to time-based pricing, the central manager 710 determines the presence of on-peak time. In the case of the on-peak time, the central manager 710 may transmit the information (first command) for controlling the operations of the energy consumption components to the API 720. Then, the information is converted through the local manager 740, and the converted information (second command) is transmitted to the energy consumption components through the first communication part 762. Alternatively, the central manager 710 may transmit the information related to the time-based pricing to the first communication part 762 through the second API 724 without determining the presence of on-peak time. In this case, the information may be converted or not converted. That is, in a case where the central manager directly receives first information (raw data), it may transmit the first information as it is, or convert the first information into a second information (refined data) and then transmit the second information.

Figure 10:
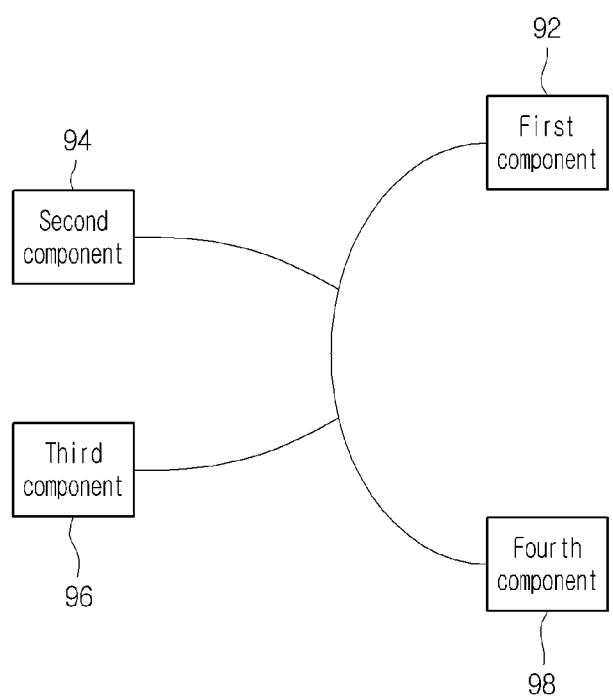
FIG. 10 is a view showing the communication structure of components that constitute the network system according to a fourth embodiment.
Figure 11:
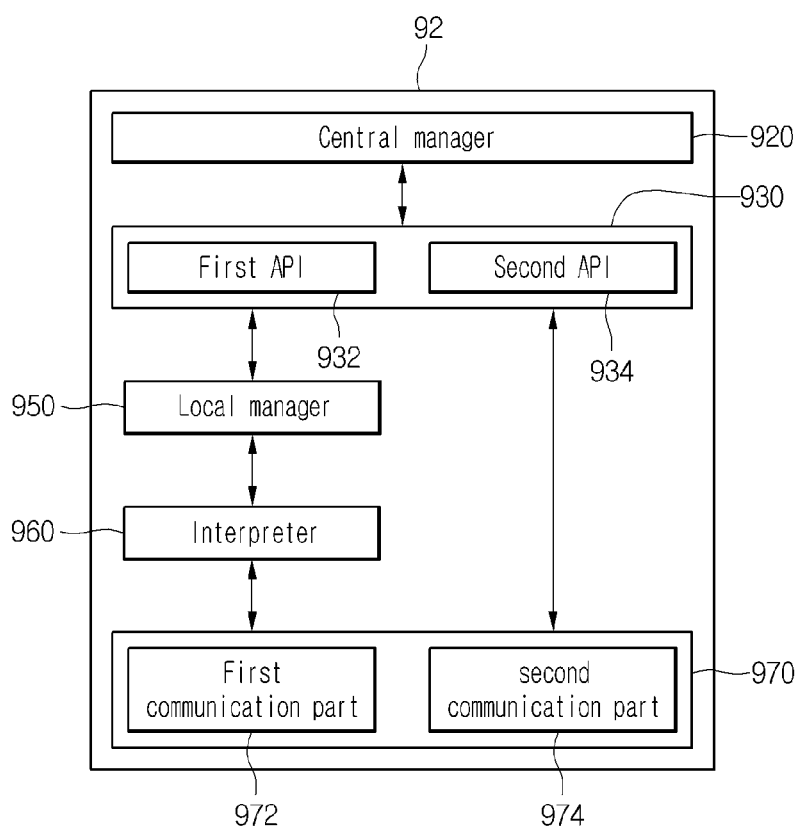
FIG. 11 is a block diagram showing the detailed configuration of a first component in FIG. 10.

FIG. 10 is a view showing the communication structure of components that constitute the network system according to a fourth embodiment. FIG. 11 is a block diagram showing the detailed configuration of a first component in FIG. 10.

Referring to FIGS. 10 and 11, the network system of this embodiment may include at least first to fourth components 92, 94, 96 and 98.

The first component 92 may communicate with the second to fourth components 94, 96 and 98. The fourth component 98 may communicate with the first to third components 92, 94 and 96.

Hereinafter, it will be described as an example that the first component 92 is a central management component (home server), the second and third components 94 and 96 are energy consumption components (electric home appliances), and the fourth component 98 is an energy metering component (smart meter).

The central management component (home server) may be understood as a component necessary for controlling at least a component that constitutes the HAN 20.

The first component 92 includes a communication unit 970 for performing communication with another component, a central manager 920 for managing the entire operation and/or information transmission/reception of the first component 92, and an application programming interface 930 (hereinafter, referred to as an "API") that serves as an interface between the communication unit 970 and the central manager 920 (specifically, application software).

The communication unit 970 may include a first communication component 972 for performing communication with the second to fourth components 94, 96 and 98, and a second communication component 974 for performing Internet communication.

The API 930 includes a first API 932 and a second API 934. The second API 934 is an interface between the central manager 920 and the second communication part 974, and the first API 930 is an interface between the first communication part 972 and the central manager 920.

The first component 92 further includes a local manager 950 and an interpreter 960. In a case where the information to be transmitted/received between the API 932 and the communication unit 970 is information related to operations of energy consumption components (electric home appliances), the local manager 950 outputs information corresponding to the respective energy consumption components. The interpreter 960 interprets information transmitted from the local manager 950 to the communication unit 970 or information received in the communication unit 970.

In this embodiment, the functions of the interpreter and the local manager are identical to those of the third embodiment, and therefore, their detailed descriptions will be omitted.

The information transmission process in the first component 92 will be described.

As an example, the first component 92 may receive energy information (e.g., energy reduction signal) from the fourth component 98 through the first communication part 972. Alternatively, the first component 92 may receive energy information from an external component connected to Internet through the second communication part 974.

The received energy information is transmitted directly to the first or second API 932 or 934 and then transmitted to the central manager 920. Since the energy information is information related to the energy consumption reduction of the energy consumption components, the central manager 920 transmits information related to the operations of the energy consumption components to the first API 932. As an example, the central manager 920 transmits information necessary for turning off power of a washing machine or refrigerator.

Then, the information is transmitted from the first API 932 to the local manager 950.

The local manager 950 transmits information for controlling the operation of each of the energy consumption components to the interpreter 960 based on the information transmitted from the first API 932. As an example, in a case where the information transmitted from the first API is information related to different kinds of energy consumption components, the local manager 950 transmits information related to the control of each of the energy consumption components to the interpreter 960.

Subsequently, the interpreter 960 interprets the information transmitted from the local manager 960 into a machine language (signal). Then, the interpreted signal is transmitted to the energy consumption components through the first communication part 972. Then, the energy consumption components are finally turned off so as to reduce energy.

Meanwhile, the second and third components 94 and 96 may transmit their own operation information to the first component 92. Since the information transmitted from the second and third components is information related to the operations of the energy consumption components, the signal received in the first communication part 972 is transmitted to the central manager 920 via the interpreter 960, the local manager 950 and the first API 932. In such an information transmission process, the information related to the first and second components is stored in the local manager 950.

The central manager 920 may transmit the received information to the first communication part 972. Then, the information of the second and third components 94 and 96 is transmitted to the fourth component 98.

The operation of the first component will be described. The information received through the communication unit 970 may be transmitted directly to the API 930, or may be converted (via the interpreter and the local manager) and then transmitted to the API 930, based on the kind of information (or the type of signal).

On the contrary, the information transmitted from the central manager 920 may be transmitted directly to the communication unit 970, or may be converted and then transmitted to the communication unit 970.

Meanwhile, in a case where the information transmitted to the API 930 through the second communication part 974 is information related to time-based pricing, the central manager 920 determines the presence of on-peak time. In the case of the on-peak time, the central manager 920 may transmit the information for controlling the operations of the energy consumption components to the API 930. Then, the information is transmitted to the energy consumption components through the local manager, the interpreter and the first communication part. In this case, the first component may be understood as an energy management component.

Although it has been described above that two energy consumption components communicate with the first component, the number of energy consumption components that communicate with the first component is not limited.

Although it has been described as an example that the first component is a home server, the first component may be an energy management component. In this case, the fourth component may be a central management component, an energy management component, a smart meter, or the like.

As another example, the first component may be a smart meter. In this case, the fourth component may be a central management component, an energy management component, or the like.

As still another example, the first component may be a terminal component (e.g., a gate way).

As still another example, each of the second and third components may be an energy generation component, an energy storage component or the like, which constitutes the HAN. That is, one or more of the energy generation component, the energy consumption component and the energy storage component may communicate with the first component. In addition to information related to the energy consumption component, information related to the energy generation component (e.g., information related to the operation of the energy generation component) and information related to the energy storage component (e.g., information related to the operation of the energy storage component) may be stored in the memory included in a local network or connected to the local network.

Although it has been described above that the first component performs Internet communication, the Internet communication may not be performed.

Although it has been described in the first embodiment that a single local manager is provided, a plurality of local managers may be provided. As an example, a first local manager may process information on an electric home appliance such as a refrigerator or washing machine, and a second local manager may process information on a display product such as a television or monitor.

Figure 12:
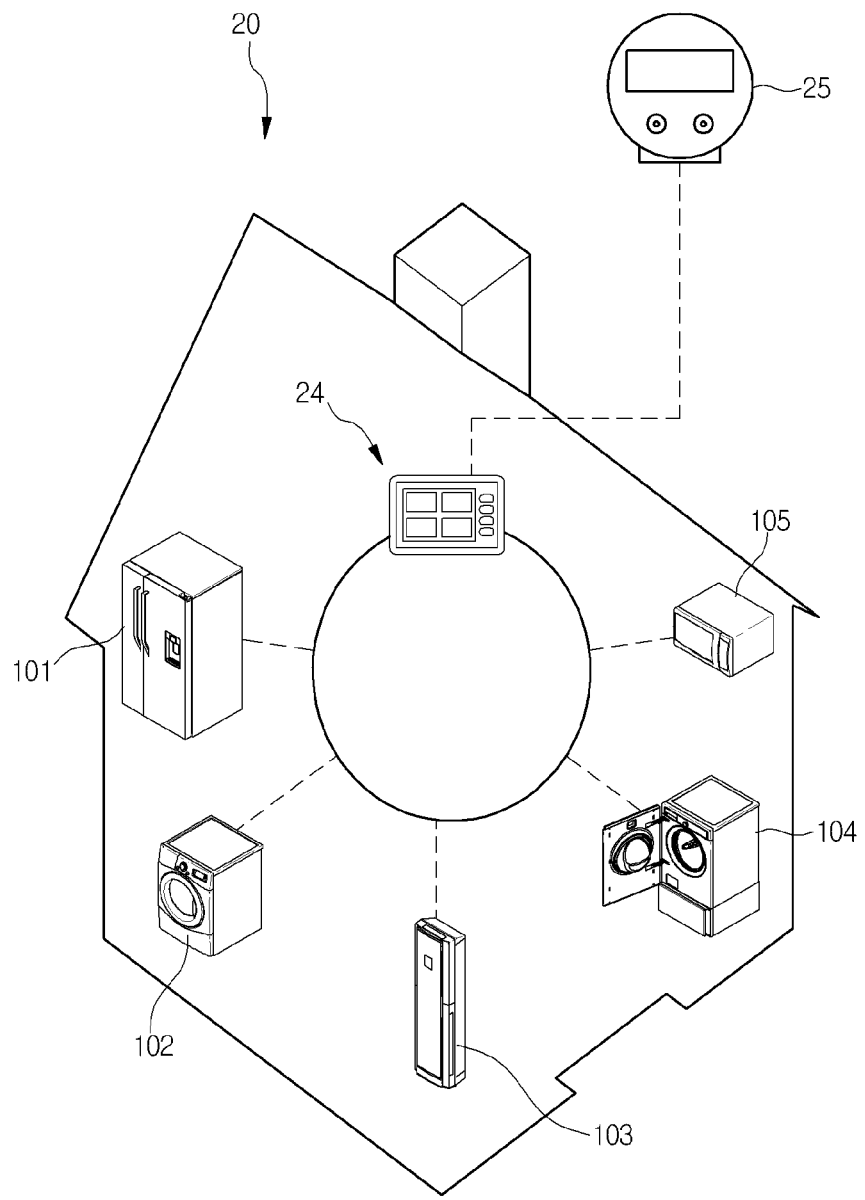
FIG. 12 is a schematic view illustrating a home area network according to the present disclosure.

FIG. 12 is a schematic view illustrating a home network according to the present disclosure.

Referring to FIG. 12, the home area network 20 includes an energy metering component 25 capable of metering one or more of the cost of power and electricity supplied to each residential customer from the utility network 10, as an example, a smart meter and an energy management component 24 connected to the energy metering component 25 and electronic appliances to control operations thereof.

On the other hand, electricity cost of the each residential customer may be charged per hour. For example, the electricity cost per hour may become expensive in a time while power consumption amount is being increased and may become inexpensive in a time while the power consumption amount is being relatively decreased such as midnight.

The energy management component 24 may be connected to electric products as the energy consumption component 26 such as a refrigerator 101, a washing machine 102, an air-conditioner 103, a drying machine 104, and a cooking appliance 105 and may communicate therewith in two ways via an in-house network.

A communication in house may be performed via one of a wireless method such as Zigbee and wifi and a wired method such as power line communication (PLC). Also, one electric product may be connected to other electric products to communicate therewith.

Figure 13:
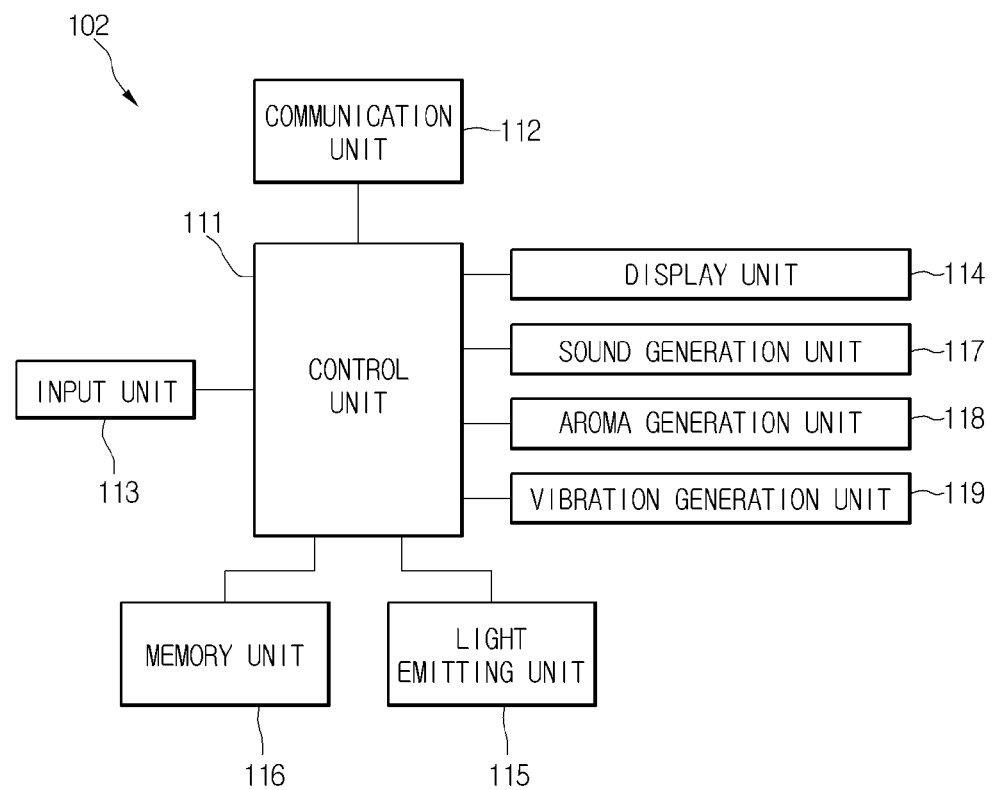
FIG. 13 is a block view illustrating a component constituting the network system according to a first embodiment.

FIG. 13 is a block view illustrating a component constituting the network system according to a first embodiment.

Referring to FIG. 13, the component constituting the network system may be one of the energy generation component 21, the energy distribution component 22, the energy storage component 23, the energy management component 24, the energy metering component 25, the central management component 27, the energy grid assistance component 28, and the energy consumption component 26. Hereinafter, as an example, it will be considered that the component is the refrigerator 102 that is the energy consumption component 26.

The component 102 may include a control unit 111, a communication unit 112, an input unit 113, a memory unit 116, and an information notification part.

The information notification part may include one or more of a display unit 114, a light emitting unit 115, a sound generation unit 117, an aroma generation unit 118, and a vibration generation unit 119.

The communication unit 112 may communicate with other components constituting the network system. Also, the communication unit 112 may communicate with the control unit 111. The control unit 111 may recognize many kinds of information.

The control unit 111 may recognize energy information, additional information, and information generated based on one or more of the energy information and the additional information. Also, the control unit 111 may generate the energy information, the additional information, and new information based on one or more of the energy information and the additional information.

The input unit 113 may allow inputting an operating condition of the component 102. As an example, a kind of objects to be displayed on the display unit 114, a displaying method, and a time for displaying may be set or changed by using the input unit 113.

In addition, with respect to energy, it is possible to select one of a general mode and a smart mode for efficiently managing energy by using the input unit 113. In the present embodiment, the smart mode means not only a mode for reducing an energy consumption or energy costs but also a mode for effectively manage energy such as conserving energy by using the energy in a time when energy costs are inexpensive. Also, before a start of operating the component 102, it is possible to select one of the general mode and the smart mode by using the input unit 113. Additionally, while the component 102 is being operated in a selected mode, it is possible to change to one of the general mode and the smart mode.

The control unit 111 may receive energy information via the communication unit 112. The control unit 111 may check operating information thereof autonomously and may receive information related to other components, that is, additional information via the communication unit 112. The display unit may display one or more of the energy information and additional information except the energy information.

There may be provided one or more the light emitting parts 115. When there are provided a plurality of the light emitting parts 115, a kind thereof may be the same or different from each other. The light emitting unit 115 may be turned on when operating the component 102 or may be turned on being related to an object displayed on the display unit 114. A user may check a kind or a phase of information and a phase of operating the component 102 by using light emitted from the light emitting unit 115. That is, the light emitted from the light emitting unit 115 may include information capable of being recognized by the user. Also, the strength of the light emitted from the light emitting unit 115 may be controlled. In addition, the color of the light emitted from the light emitting unit 115 may be changeable. The strength and color of the light may vary with information to be displayed. Additionally, the light emitting unit 115 may be turned on/off periodically depending on the kind of information, and a period of being turned on/off or a ratio of being turned on/off may be changeable.

The sound generation unit 117 may include a buzzer circuit and a speaker. The sound generation unit 117 may be operated in relation to the operation of the component 102 or may be operated to notify information recognized by the control unit 111. Sounds generated by the sound generation unit 117, such as a certain sound, a melody, and a voice of a human, may be set or changed via the input unit 113 and may vary with the kind of the information.

The aroma generation unit 118 may indicate information by generating an aroma. An amount of the aroma generated by the aroma generation unit 118 may vary with the kind of the information.

The vibration generation unit 119 may indicate information by generating a vibration. The strength and time of the vibration generated by the vibration generation unit 119 may vary with the kind of the information.

In the memory part 116, there may be stored the energy information and the additional information. Also, in the memory part 116, there may be stored conditions set or changed via the input unit 113.

According to the present disclosure, since the energy information and the additional information may be transmitted and received among components, an energy source may be effectively produced, used, distributed, and stored, thereby effectively managing the energy source. Also, since the information notification part displays one or more of the energy information and the additional information, the user may check the information and effectively manage the component.

Figure 14:
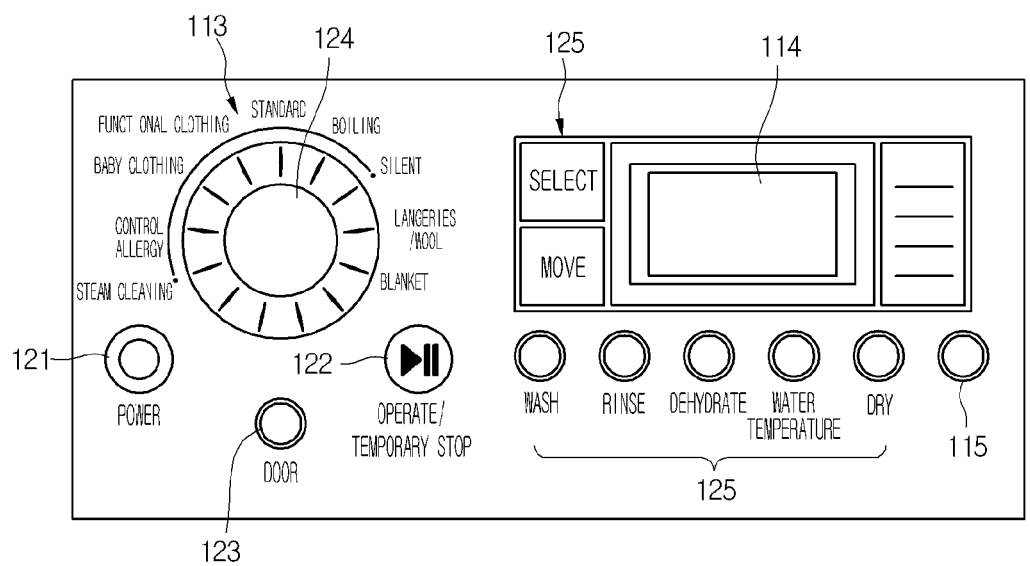
FIG. 14 is a view illustrating an example of the arrangement of an input unit and a display unit in the component of FIG. 13.

FIG. 14 is a view illustrating an example of the arrangement of the input unit 113 and the display unit 114 in the component of FIG. 13.

Referring to FIG. 14, the input unit 113 and the display unit 114 may be located being adjacent to each other. Also, the light emitting unit 115 may be located being adjacent to one or more of the input unit 113 and the display unit 115.

Also, via the input unit 113, a subject of the information to be displayed may be selected and may vary.

The input unit 113 may include a plurality of selection parts 121, 122, 123, 124, 125, and 126. The plurality of selection parts 121, 122, 123, 124, 125, and 126 may be buttons or knobs. When each selection part is operated, the light emitting unit 115 emits light toward the selection part in such a way that it may be checked whether the selection part is operated.

Figure 15:
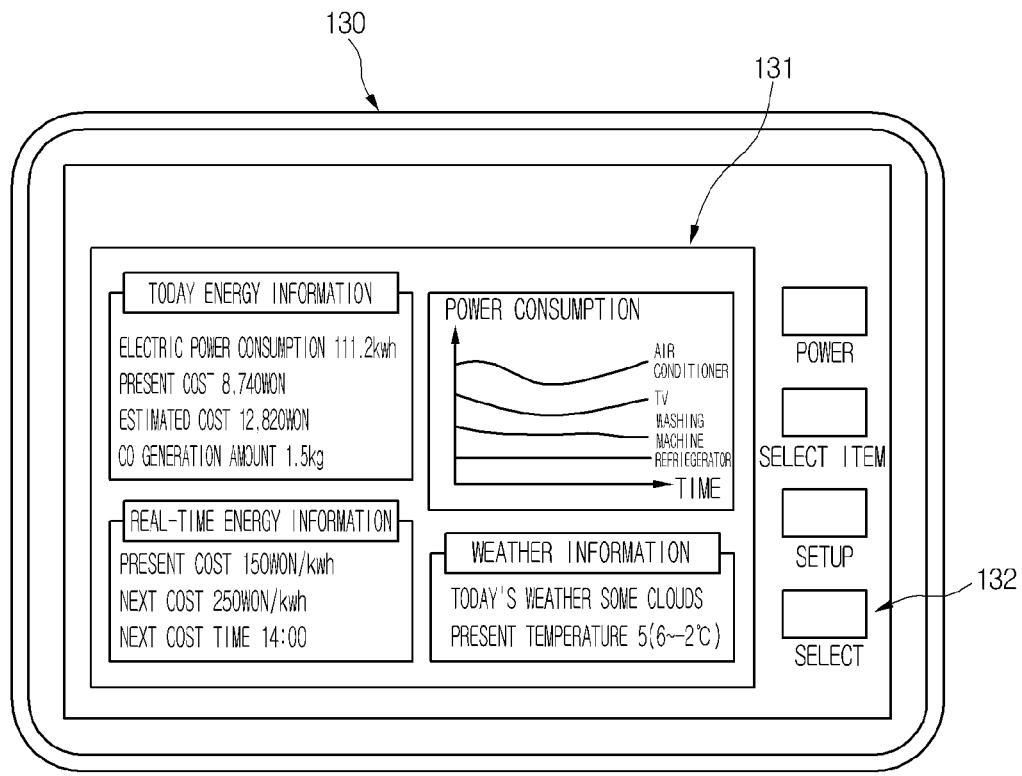
FIG. 15 is a front view illustrating a component forming the network system according to a second embodiment.

FIG. 15 is a front view illustrating a component 130 constituting the network system according to a second embodiment.

Referring to FIG. 15, the component 130 may include at least a display unit 131 and an input unit 132. Not shown in the drawing, the component 130 may further include a control unit, a memory unit, and a light emitting part like those in FIG. 13. A detailed description thereof will be omitted.

The display unit 131 may display energy information and additional information including information related to a plurality of components. For example, any one of the plurality of energy consumption components is selected and information related thereto may be displayed. Alternatively, according to the kind of information, information on the plurality of components may be displayed simultaneously. As an example, power consumption information and whether a component being operated of each of the plurality of components may be displayed. Via the input unit 132, it is possible to select one component to be displayed from the plurality of components.

The component 130 may transmit and receive information of the plurality of components. As an example, the component 130 may be one of the energy management component 24, the energy metering component 25, the central management component 27, and the energy consumption component 26.

Figure 16:
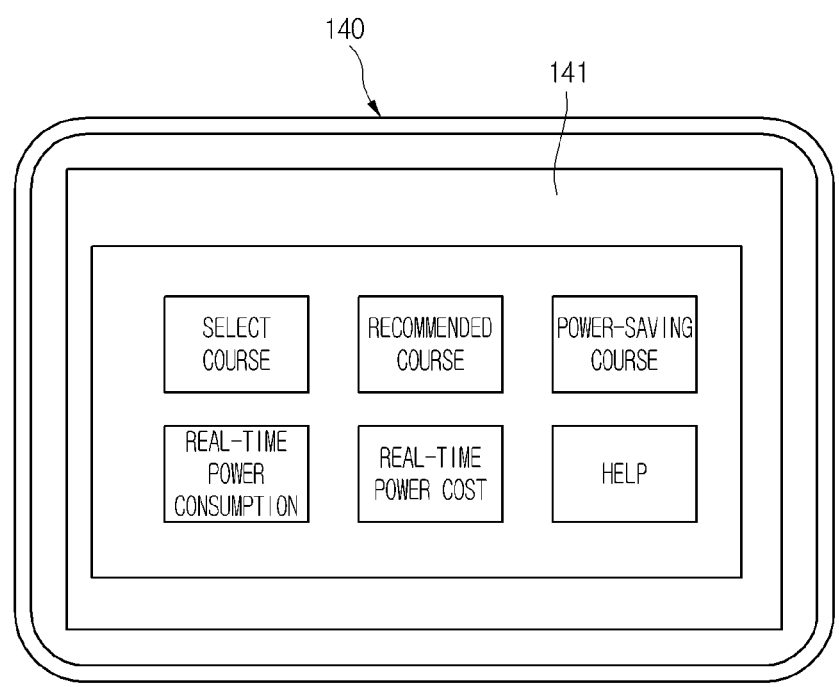
FIG. 16 is a view illustrating another example of the display unit of the component of FIG. 13.

FIG. 16 is a view illustrating another example of a display unit 140 of the component of FIG. 13.

Referring to FIG. 16, the display unit 140 may include a touch screen 141 for selecting various functions using a touch. In this case, the touch screen 141 performs functions of an input unit. That is, without an additional input unit, a subject of information to be displayed, a display method, and a display time may be selected or set by touching the touch screen 141.

Figure 17:
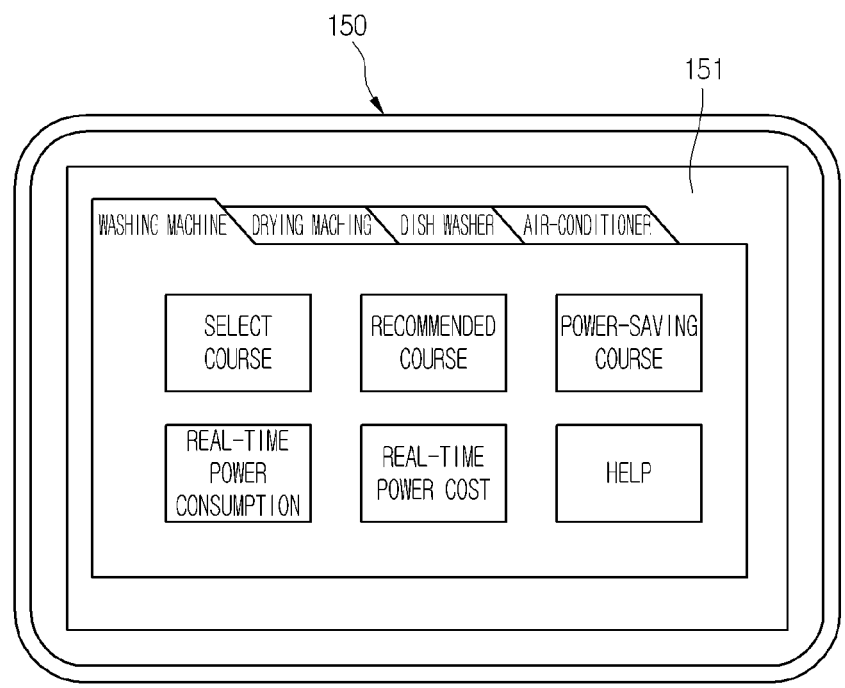
FIG. 17 is a view illustrating another example of a display unit of the component of FIG. 15.

FIG. 17 is a view illustrating another example of the display unit of the component of FIG. 15.

Referring to FIG. 17, a display unit 150 in the present embodiment may include a touch screen 151 for selecting various functions using a touch. In this case, the touch screen performs functions of an input unit. Different from the display unit 140 of FIG. 16, in the display unit 150 of the present embodiment, one of the plurality of components may be selected, information of the selected component may be displayed, or operation conditions may be inputted.

Hereinafter, there will be described in detail the subject of the information to be displayed on the display unit, a method of displaying the information, and the display time thereof.

(1) Subject to be Displayed

The information notification part of the present disclosure may display one selected from the energy information and the additional information or display both of them at the same time. Also, one or more of one or more pieces of the energy information and one or more pieces of the additional information. That is, the display unit 31 may display two or more pieces of information.

First, the information notification part may display energy cost information, as an example, electricity cost as energy information. The energy cost information may include present cost, past cost, or estimated cost in the future. The energy cost information displayed in the information notification part may be one of real-time information and schedule information.

The energy cost information may include not only information on cost in a specific period or time but also information on cost used with respect to the operation of a component, cost used in the present, and cost to be used, that is, estimation cost, which are energy information related to the additional information. As an example, there may be displayed information on cost used for a certain component using for a certain period, cost used for operating the certain component in a certain mode, and estimated cost to operate the certain component in the certain mode.

In this case, use cost may be determined by the component with the display unit for displaying the use cost or may be received from other components. The use cost may be determined using an energy consumption amount and energy cost information.

Also, the information notification part may display information except the energy cost information. The information except the energy cost information includes information on energy reduction, emergency situation, grid safety, power generation quantity, operation priority, energy consumption, energy supply amount, information (e.g., cost change rate, average cost, level or the like) newly generated based on two or more pieces of information (one or more pieces of energy cost information and/or information except the one or more pieces of energy cost information), and the like. In this case, the energy consumption may be energy consumption used two or more home networks, and may be simultaneously or selectively displayed.

For example, there may be displayed information of receiving an energy reduction signal, on/off peak time information, present/past/future power generation information, information on an energy consumption component to be operated prior to others, and energy consumption amount information of one or more of the plurality of energy consumption components.

The energy consumption component, as described above, may be a single component or the plurality of components, and energy consumption amount information of each of the plurality of components.

The energy consumption amount information may include past consumption amount information, present consumption amount information, and estimated future consumption amount information. Also, the energy consumption amount may include information on an accumulated consumption amount, an average consumption amount, an increasing consumption rate, a decreasing consumption rate, a maximum consumption amount, and a minimum consumption amount in a certain period (time). In this case, the energy consumption amount information may be determined by the component or may be received from other components, as an example, the energy metering unit directly or indirectly.

Also, with respect to an energy consumption amount, there may be displayed a residual energy consumption amount available before applying an cumulative tax, a residual number of times available before applying the cumulative tax, and a residual time.

Also, with respect to the information except the energy cost information, there may be displayed a source of supplying energy or a place of an origin of energy consumed in present. In other words, there may be displayed whether energy is supplied from the utility network 10 or the energy storage unit 23 of the home area network 20.

On the other hand, the information notification part may display environment information as the additional information.

The environment information, as described above, may include carbon dioxide emission rate, concentration of carbon dioxide in air, temperature such as indoor temperature and outdoor temperature, humidity, precipitation, presence of rainfall, amount of solar radiation, and an amount of wind. The carbon dioxide emission rate information may include an estimated emission amount when an energy consumption component is operated, an emission amount related to power consumed by the energy consumption component, and an actual emission amount in the air.

Also, the information notification part may display time information as the additional information. The time information may include time related to the energy information and time related to other additional information such as information on the operation of the component.

Also, the information notification part may display one of component operation information and component phase information as the additional information. As an example, there may be displayed information on a mode of the component being operated in present, information for notifying of a change in mode, an operation time, an operation estimation time, a finish time, a finish estimation time so far, disorder information, program update information, and information on whether a program is in need of being updated.

In this case, the information for notifying of a change in mode includes not only a case where a mode is changed by an input from the input unit but also a case where a mode is automatically changed. As an example of the case where a mode is automatically changed, a general mode may be changed to a smart mode when a door of a component such as a refrigerator is not open for a certain period of time. Also, when a door is open after the general mode is changed to the smart mode, the smart mode may be changed to the general mode.

In addition to the information as described above, the information notification part may display one of information processed based on one or more pieces of information or newly generated information.

For example, when a certain condition is inputted by the input unit, the display unit may display one or more of the energy information and the time information related to the operation of the component. The energy information may be one of energy cost information for unit power and energy cost information while the component is operated in a certain way. The time information related to the operation of the component may be one of a start time, a finish time, and a duration time from a start to a finish of the operation of the component. In this case, one or more of the energy information and the time information displayed on the display unit may not be a certain value but labeled information. For example, an energy cost may be displayed as 1, 2, and 3 or high, medium, and low. Alternatively, the time information may be displayed 1, 2 and 3 or morning, afternoon, and evening.

In this case, when the energy cost is displayed as being labeled, the time information may be displayed as one of being labeled and a certain value. On the contrary, when the time information is displayed as being labeled, the energy cost may be displayed as one of being labeled and a certain value. Alternatively, when a certain time is inputted, there may be displayed one of an energy cost being labeled and an energy cost for unit power. Alternatively, when a certain cost is inputted, there may be displayed time information as being labeled. Alternatively, in a phase before inputting time information, there may be displayed one of an energy cost being labeled or an energy cost for unit power. When the energy cost is displayed being in labeled, there may be arranged sequentially a plurality of pieces of labeled information.

When the component is one of the energy storage components 13 and 23, there may be displayed whether using stored electricity and a residual amount of the stored electricity. When the residual amount of the stored electricity is less than a certain value, there may be displayed alert information.

Also, the information notification part may display whether a certain function of a component is available or not.

Also, the information notification part may display whether a door of a component such as a refrigerator, a washing machine, and a cooking appliance is open or not and an alert against a certain operation of the component.

As an example, when a door is open, there may be displayed certain information. In this case, information to be displayed may vary with the kind of energy information when opening a door. For example, when a door is open in an off peak section, a light emitting unit may be turned on (the additional information related to the energy information). On the contrary, when a door is open in an on peak section, the light emitting unit may be turned on, may flicker on and off, and may change a color thereof. Also, two or more of the light emitting unit, the sound generation unit, and the display unit constituting the information notification part may be operated simultaneously.

As another example, one or more of times of opening a door of the component for a certain time period and an accumulated amount of time for opening a door reach reference values, there may be displayed information notifying of them.

Also, the information notification part may display information on practices of a user of the component. As an example, there may be displayed times of opening a door of the component such as a refrigerator, a washing machine, and a cooking appliance, a time amount for once opening a door, a time period of opening a door, and information on a rank list of time periods of opening a door, which is information newly generated based on a plurality of pieces of the additional information.

As another example, information on an energy consumption amount for once opening a door, which is energy information related to the additional information, and a total power consumption amount for once or more opening a door for a certain time period.

Also, the information notification part may display recommendation information related to the component. As an example, when the user would like to operate the component in a time section with a high energy cost, there may be displayed information recommending a time section with a low energy cost.

As another example, in case where certain references with respect to a cost, a power consumption amount, and a time are previously set, when selecting an operation mode or a course of the component, there may be displayed information recommending an optimum operation method or time of the component based on the energy information.

As another example, there may be displayed information recommending an operation method or time of the component based on the energy information and the environment information.

For example, when a certain condition is inputted via the input unit, recommendation information related to an operation method or time period of the component, which is the energy information or the additional information, may be displayed on the display unit. There may be recommended a driving method, a power consumption amount, a power-saving level, and a start time for driving with respect to the component. In this case, there may be displayed information whose kind is different from that of information inputted via the input unit. For example, when a driving method is inputted, there may be recommended information in addition to the driving method. The display unit may further display, together with recommendation information, information on energy used while the component is being operated, and particularly, operated in a certain mode in a certain time period, such as a cost for using electricity. In this case, the user may select one of the recommendation information and a preferable operation method or time. Alternatively, though the user inputs a command for an operation in a certain mode, the component may be operated in a changed mode to reduce a cost for using electricity. In this case, information on the changed mode may be displayed on the display unit.

Also, the information notification part may display information newly generated based on a plurality of pieces of the energy information. For example, based on an energy cost in a certain time period and a cost of using energy in the time period, it may be displayed whether a component is operated in the time period or not. The user may recognize displayed information and consider the same when operating the component later.

Also, one of the display unit and the input unit may display a function or menu available of being operated in present. Alternatively, one of the display unit and the input unit may display available ones and unavailable ones from a plurality of functions as being distinguished by size, color, and location. Alternatively, when there are present additional input units, only input units for selecting available functions are activated or input units for selecting available functions may be displayed in a color different from that of input units for selecting unavailable functions.

The described subject of display may be selected or changed using an input unit, and it may be selected and changed whether to display the subject of display or not.

(2) Display Method

All information corresponding to the described subject of display may be displayed using methods as follows.

Methods of displaying information may include a visual display method, an aural display method, and a mixed method of the visual display method and the aural display method. Also, methods of displaying information and display forms of the respective methods may be changed automatically or manually.

Figure 18:
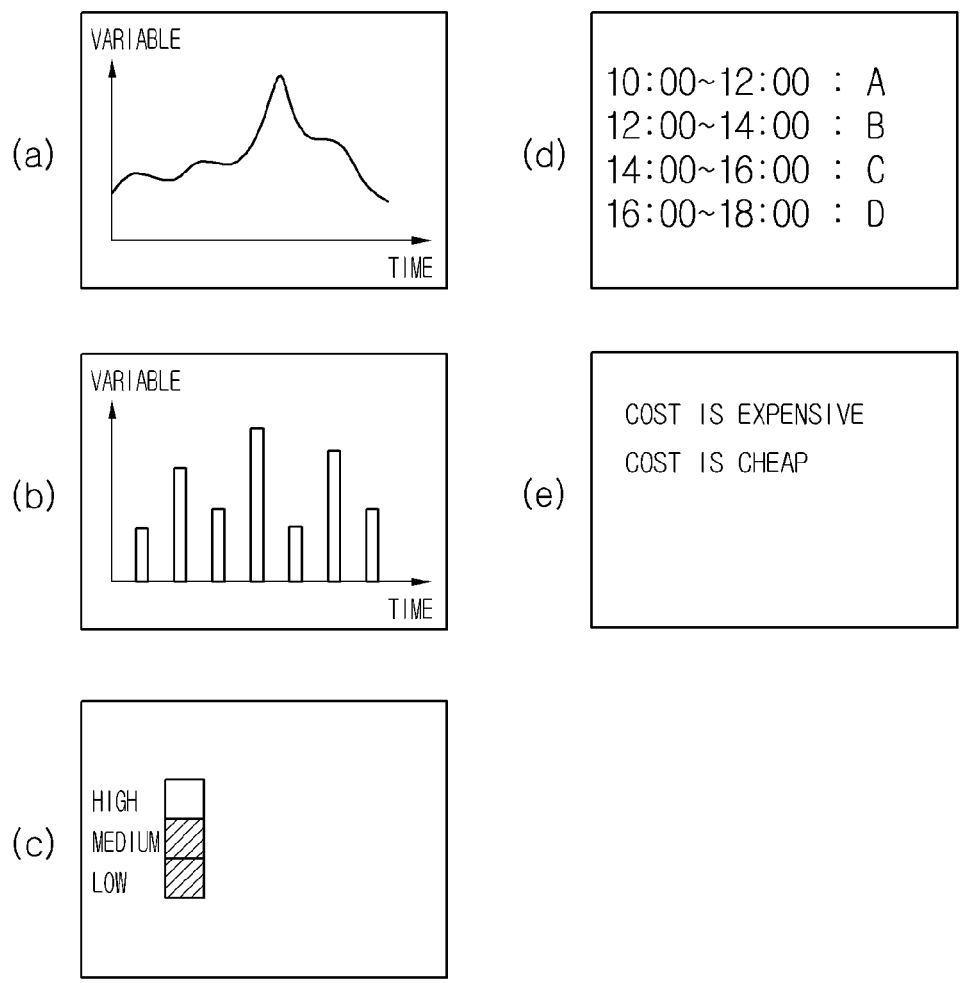
FIG. 18 is a view illustrating examples of a method of displaying information.

FIG. 18 is a view illustrating examples of a method of displaying information. Referring to FIG. 18, information may be displayed in the forms of a graph for a time section or a time period, a level, and a table. As an example, an energy cost for unit time may be displayed in the forms of a level, a graph, and a table.

Also, information may be displayed in numbers, characters, sentences, figures, symbols, and images such as avatars via the display unit. In this case, depending on the kind of the information, a shape, a color, brightness, size, and location of the information displayed on the display unit may vary.

As an example, cost information may be displayed being distinguished by a plurality of colors. Alternatively, based on a reference value inputted by the user, different colors may be displayed when the cost information is greater or smaller than the reference value. For example, a portion where an energy consumption amount exceeds the reference value may be displayed in a different color from that of a portion where the energy consumption amount does not exceed the reference value.

As another example, information displayed on the display unit may flicker on and off on a regular cycle.

Meanwhile, information may be displayed via the light emitting unit. In this case, strength, color, flickering of light emitted from the light emitting unit may vary with the kind of the information. As an example, when energy costs are divided into levels, a color may vary with a level. As another example, an on/off time period or an on/off time rate of the light emitting unit may vary with the kind of the information. Also, when there are in present a plurality of light emitting units, the number of light emitting units turned on/off may vary with the kind of the information. For example, when energy costs are divided into three levels, the number of light emitting units turned on may be increased or decreased as a cost becomes expensive.

On the other hand, information may be displayed via a sound generation unit. A kind, time, and strength of a sound generated by the sound generation unit may vary with the kind of the information. Also, information may be displayed by a vibration generation unit, which is tactile information. Also, strength and time of a generated vibration may vary with the kind of the information. As an example, when the user operates an input unit on peak, there may be generated a vibration.

Also, information may be displayed via an aroma generation unit, which is olfactory information. In addition, kind of a generated aroma may vary with the kind of the information. As an example, when the user operates an input unit, there may be generated an aroma.

In case of means for displaying information as described above, such as the display unit, the light emitting unit, the sound generation unit, the vibration generation unit, and the aroma generation unit, only one thereof may be operated or more than two thereof may be operated at the same time.

(3) Display Time

All information corresponding to the subject of display as described above may be displayed at times as follows.

The information may be notified via the information notification part when satisfying conditions for notifying the information.

As an example, one or more pieces of information may be displayed by selecting information display and selecting information to be displayed using the input unit. Alternatively, regardless of selecting information display, when the user is in contact with a part of a component such as an input unit, a handle, and a display unit or operates one or more buttons or knobs constituting the input unit, a portion of information may be displayed. Also, in this case, the information to be displayed may be set or changed. Of course, the component may include a sensing unit for sensing contact of the user.

As an example, when an operation mode of the component is selected by the input unit, the display unit may display energy information related to the selected mode. For example, when selecting a certain operation mode, there may be displayed an electricity cost for unit power for each time period, a total amount of electricity use cost while operating in a corresponding mode, and a total amount of power consumption.

Alternatively, the information may be displayed when a human body sensor of the component senses a human body in a phase where the user is not in contact with the component.

Alternatively, the information may be displayed according to variables in an environment where the component is installed or an outdoor environment thereof. For example, when intensity of illumination in a place where the component is installed is less than a certain value, information may be displayed or may disappear. Alternatively, the information may be displayed at a set time. As an example, certain information may be displayed automatically every hour. Alternatively, the certain information may be displayed when a sensed value becomes a certain reference. For example, in case of setting up the number of times of opening a door for a certain amount of time to be 5 or setting up a time of opening a door to be 10 minutes, information notifying of the set-ups may be displayed when satisfying the set-ups.

Alternatively, the certain information may be displayed when corresponding to an operation restriction condition previously set. As an example, when inputting a command of starting a component in an on peak section or setting the command as a reservation, there may be displayed alert information. Alternatively, certain information may be displayed when receiving new information. Alternatively, certain information may be displayed when kind or phase thereof varies. As an example, a light emitting unit may be turned off in an off peak section and be turned on when on peak section comes. Alternatively, certain information may be displayed automatically when operation or phase of the component varies. For example, when a mode of the component is changed, information related to the changed mode may be displayed automatically. As another example, when a door of a component is open, certain information may be displayed. In this case, a subject to be displayed and a display method when changing to a certain mode of the component may be changed or set up automatically or manually.

The subject of display, the display method, and the display time as described above may be updated. As an example, a certain component may receive information related to a subject of display, a display method, and a display time from another component and update. Alternatively, a certain component may update information via a connection with a computer or a portable storage device.

Although embodiments have been described with reference to a number of illustrative embodiments thereof, it should be understood that numerous other modifications and embodiments can be devised by those skilled in the art that will fall within the spirit and scope of the principles of this disclosure.

Figure 19:
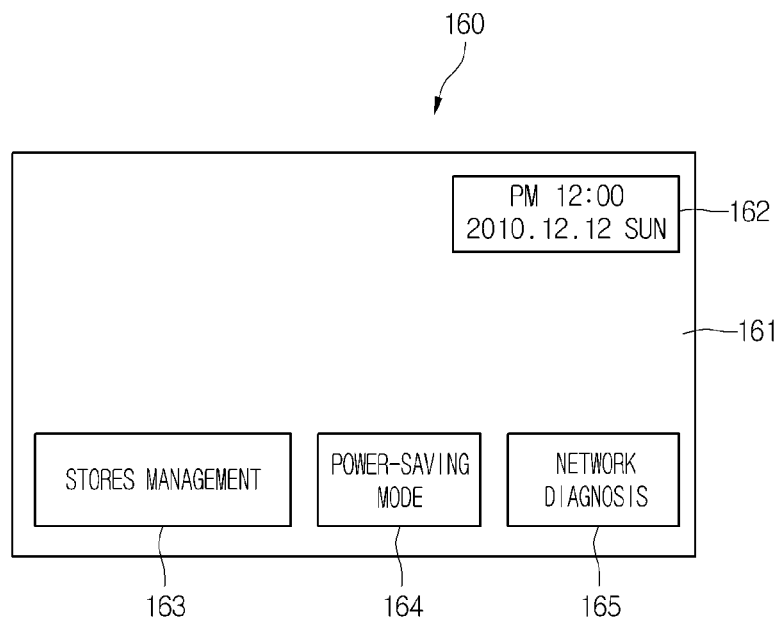
FIG. 19 is a configuration view illustrating a display unit of a component according to a third embodiment.

FIG. 19 is a configuration view illustrating a display unit 160 of a certain component according to a third embodiment of the present disclosure.

Referring to FIG. 19, the display unit 160 includes a main screen 161 where information related to driving the certain component, energy information, and additional information are displayed. The main screen 161 includes a time display unit 162 displaying a present date and time.

The main screen 161 may include a stores management selector 163 selected for managing stores, a power-saving mode selector 164 selected for power-saving drive, and a diagnosis selector 165 selected for diagnosing the operation of a network system.

When selecting the stores management selector 163, it is possible to check a list of stores stored in a storeroom of a certain component such as a refrigerator. The list includes a date when starting storage of stores and a storable date in the future and may be updated according to putting into or taking out the stores.

When selecting the diagnosis selector 165, it may be recognized whether transmission and reception of information are performed perfectly on the network system. When the transmission and reception of information are not performed smoothly, the user may be notified of it.

A method of notifying the user may include flickering of the diagnosis selector 165, outputting an additional message on the main screen 161, and outputting a voice signal.

When selecting the power-saving mode selector 164, one of energy information related to driving a certain component and additional information related thereto may be displayed. Hereinafter, contents displayed when selecting a power-saving mode will be described in detail.

Figure 20:
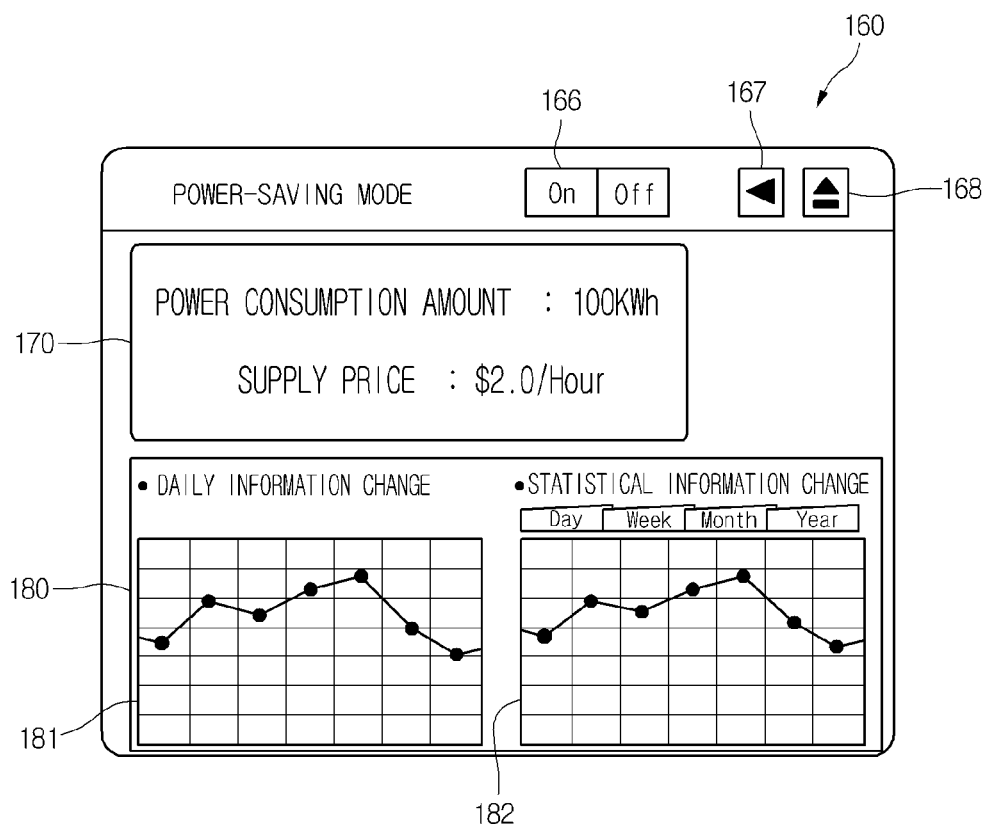
FIG. 20 is a view illustrating a screen of the display unit of FIG. 19 in a power-saving mode.
Figure 21:
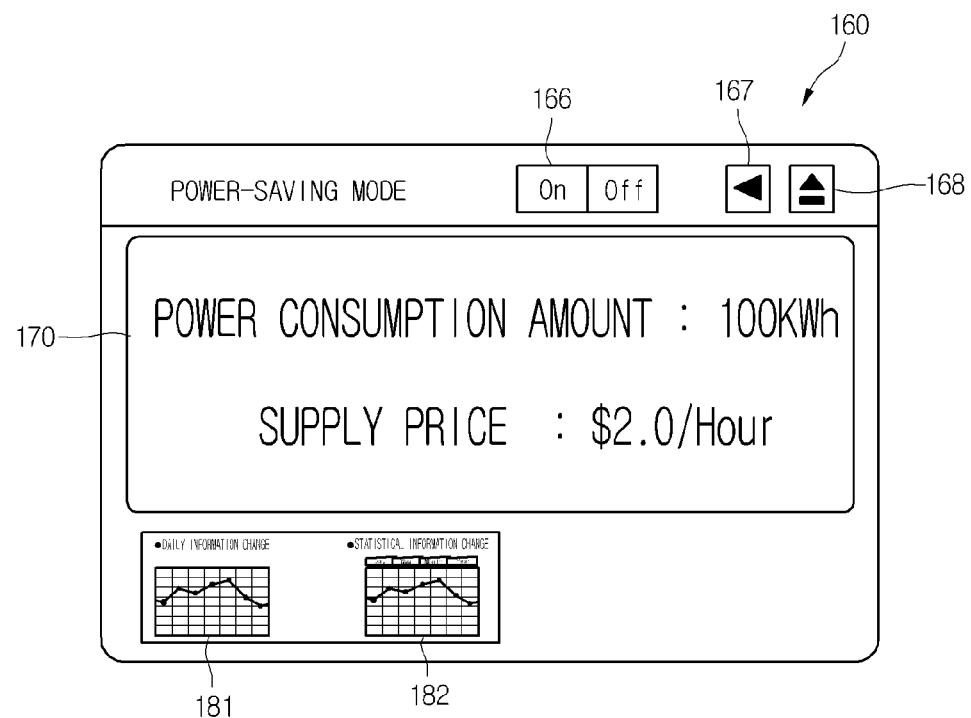
FIG. 21 is a view illustrating a character-display part in the screen of FIG. 20 being in an active mode.
Figure 22:
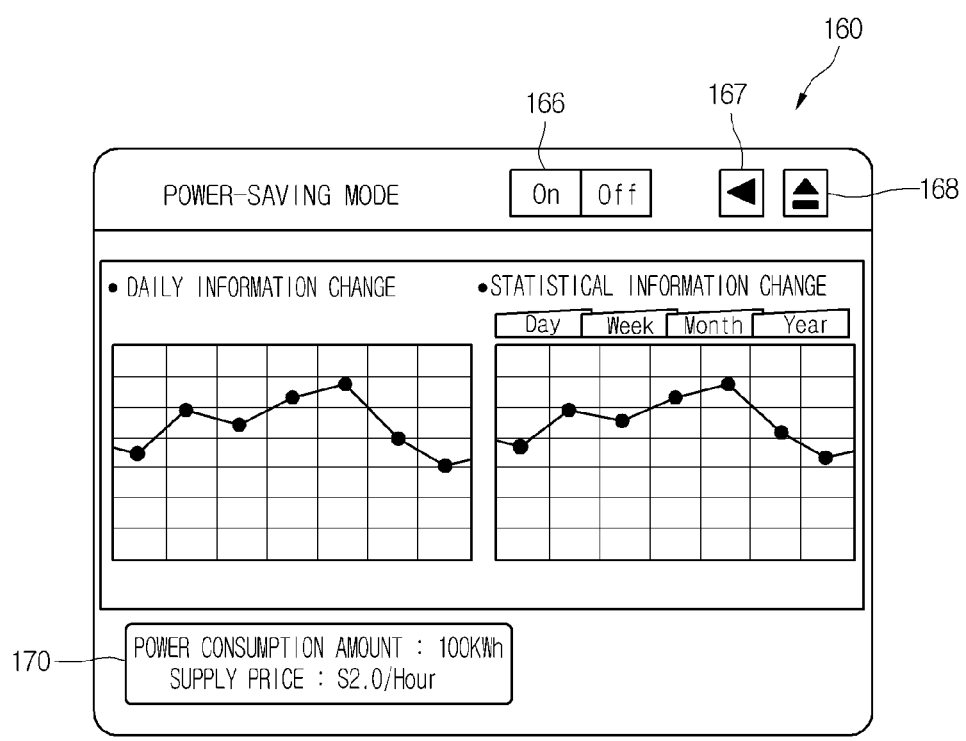
FIG. 22 is a view illustrating a daily information graph in the screen of FIG. 20 being in an active mode.

FIG. 20 is a view illustrating a power-saving mode screen of the display unit 160 of FIG. 19. FIG. 21 is a view illustrating a character-display part 170 in the screen of FIG. 20 being in an active mode. FIG. 22 is a view illustrating a daily information graphs in the screen of FIG. 20 being in an active mode.

FIG. 20 illustrates a configuration of the screen of the display unit 160 when the power-saving mode selector 164 is selected.

The display unit 160 includes the character-display part 170 where there is displayed at least one of a power consumption amount and a supply price and a graph-display part 180 where there are displayed a daily information change and a statistical information change related to an electricity cost and a power supply amount. The character-display part 170 may be referred to as a first display part, and the graph-display part 180 may be referred to as a second display part.

The character-display part 170 includes a portion where there is displayed an amount of power consumed by the certain component and a portion there is displayed an hourly cost of electricity supplied to the certain component. The first display part and the second display part may be displayed in characters, numbers, and figures. Energy information displayed on the character-display part 170 may be one of energy information at a certain point of time such as present, past, and future.

The graph-display part 180 includes a daily information graph 181 and a statistical information graph 182 displaying energy information related to supplied electricity, that is, electricity cost or a change in an power supply amount. The daily information graph 181 illustrates a change of the energy information on a daily basis. When a power supply amount is great, it may be considered as an increase of electricity cost. Also, the statistical information graph 182 illustrates a change in energy information on daily, weekly, monthly, and yearly bases. On top of the statistical information graph 182, there may be provided a plurality of touch portions capable of selecting a time section desired to be checked, that is, day, week, month, or year.

In other words, the graph-display part 180 illustrates a time-based change of energy information. In this case, it may be considered that "time-based" indicates points in time of present, past, and future.

The character-display part 170 and the graph-display part 180 are displayed at the same on the display unit 160, there is provided an effect of easily checking energy information.

Meanwhile, though energy information is displayed via the character-display part 170 and the graph-display part 180 in the drawing, different from this, there may be displayed additional information received outside via a communication unit. The display unit 160 further includes an on/off selector 166 capable of driving in a power-saving mode in such a way that the certain component is driven in the power-saving mode. The on/off selector 166 includes an on input unit and an off input unit, which are selectable. When the on input unit is selected, the certain component may be driven in the power-saving mode. When the off input unit is selected, the certain component may be not driven in the power-saving mode. Also, the display unit 160 further includes a previous phase selector 167 capable of allowing the main screen 161 to turn back to a previous phase and an initial screen converter 168 allowing the main screen 161 to be converted into an initial screen.

On the other hand, since there are displayed various information display parts such as the character-display part 170 and the graph-display part 180 on the display unit 160 with a limited size, a size of the respective display parts may be limited. Particularly, it may be limited that displayed contents are definitely recognized by elders and kids.

FIG. 21 illustrates a configuration of the display unit 160 displayed when the character-display part 170 is selected, and FIG. 22 illustrates a configuration of the display unit 160 displayed when the graph-display part 180 is selected.

The character-display part 170 or the graph-display part 180 may be selected automatically or manually. First, there will be described a case where the character-display part 170 or the graph-display part 180 is selected automatically.

In a phase where the character-display part 170 and the graph-display part 180 are displayed simultaneously as shown in FIG. 20, the character-display part 170 may be displayed being enlarged as shown in FIG. 21 when a first set time elapses and the graph-display part 180 may be displayed being enlarged as shown in FIG. 22 when a second set time elapses. That is, one of the character-display part 170 and the graph-display part 180 may be displayed alternately according to the elapse of time. Of course, it may be previously set to select which one of the character-display part 170 and the graph-display part 180 to be displayed first.

Meanwhile, one of the character-display part 170 and the graph-display part 180 may be selected manually. In the phase where the character-display part 170 and the graph-display part 180 are displayed simultaneously as shown in FIG. 20, when the character-display part 170 is touched or a certain input unit is inputted, there is displayed a screen as shown in FIG. 21. On the contrary, when the graph-display part 180 is touched or a certain input unit is inputted, there is displayed a screen as shown in FIG. 22. In this case, the certain input unit may be an additional input unit for converting a display screen or may be a previously provided input unit that is an existing input unit to perform a certain function of a certain component. When the certain input unit is an existing input unit, the display screen may be converted by one of the number of pushing the existing input unit and operating a push time thereof. For example, the display screen may be converted by pushing the existing input unit two times or pushing the existing input unit two or more seconds.

Referring to FIG. 21, when the character-display part 170 is selected in FIG. 20, the selected character-display part 179 is displayed on the main screen 161 being enlarged and the graph-display part 180 not selected is displayed thereon being reduced. As another example, when the character-display part 170 is selected, the graph-display part 180 not selected may be controlled to disappear or to be turned off.

In FIG. 22 contrary to FIG. 21, when the graph-display part 180 is selected in FIG. 20, the selected graph-display part 180 may displayed on the main screen 161 being enlarged and the character-display part 170 not selected is displayed thereon being reduced. Of course, the character-display part 170 not selected may disappear from the main screen 161.

In this case, a case where the size of a display unit not selected is reduced or the display unit disappears is designated as "deactivation" of the display unit. On the contrary, a case where the size of another display unit that is selected becomes enlarged is designated as "activation".

In one of the phases as shown in FIGS. 21 and 22, it may return to the screen as shown in FIG. 20 when selecting the previous phase selector 167, touching the main screen 161, or after a previously set amount of time elapses.

Hereinafter, another example of the display method described with reference to FIGS. 20 to 22.

Figure 23:
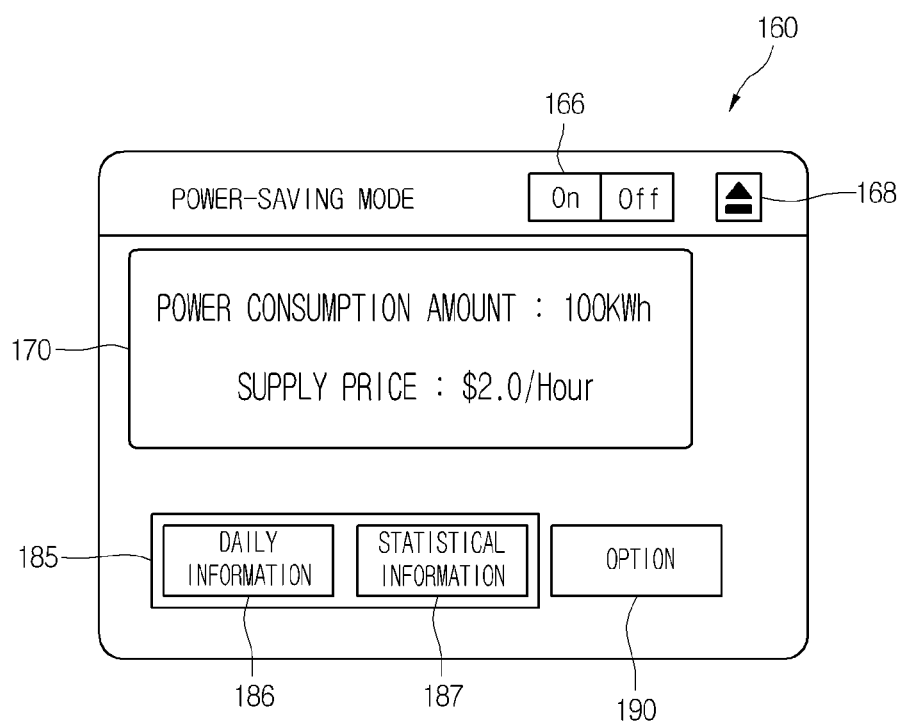
FIG. 23 is a view illustrating another example of the display unit of FIG. 20.
Figure 24:
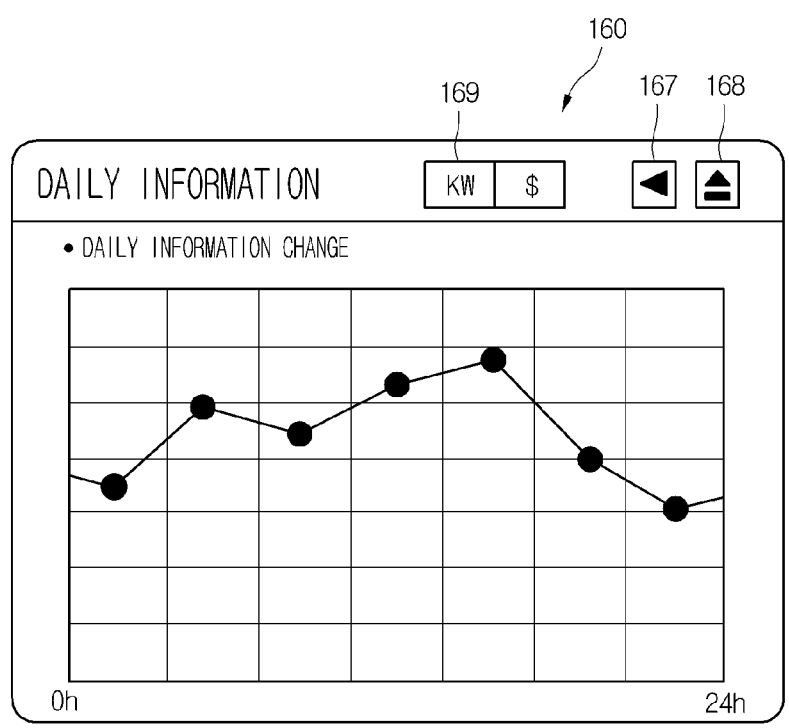
FIGS. 24 and 25 are views illustrating graphs displayed in the display unit of FIG. 23, respectively.
Figure 25:
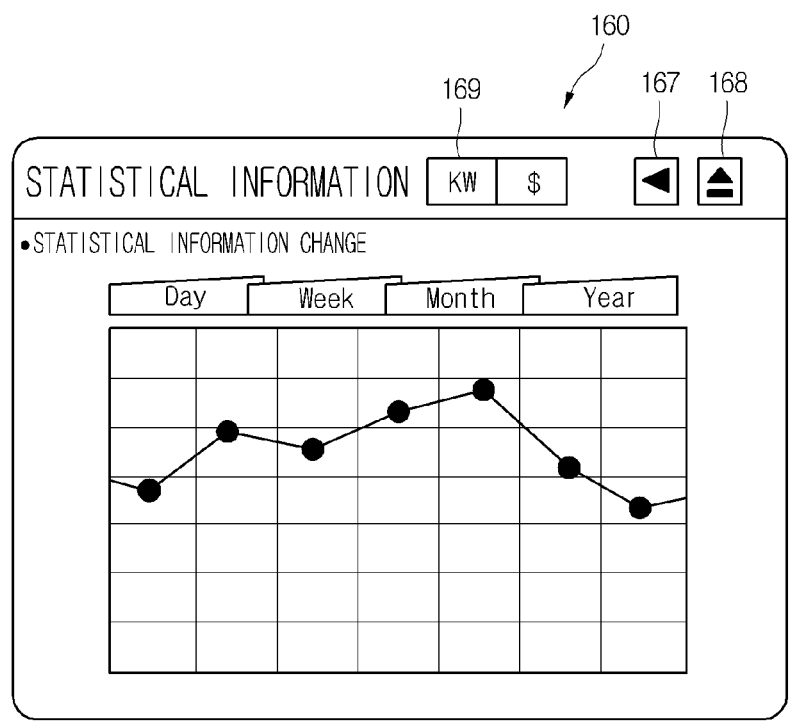

FIG. 23 is a view illustrating another example of the display unit 160 of FIG. 20, and FIGS. 24 and 25 are views illustrating graphs displayed on the display unit 160 of FIG. 23, respectively.

Referring to FIGS. 23 to 25, the display unit 160 includes the character-display part 170 and a graph selector 185. As described above, the character-display part 170 includes a first display portion displaying a power consumption amount and a second display portion displaying a supply price. The graph selector 185 includes a daily information selector 186 capable of displaying a change of daily information related to energy information and a statistical information selector 187 capable of displaying a change in statistical information related to the energy information.

The display unit 160 further includes an option selector 190 capable of setting an environment of displayed contents. The option selector 190 allows setting up a reference point in time, that is, one point in time of present, past, and future of information illustrated in one of the character-display part 170 and the graphs 181 and 182. Also, the option selector 190 may set up a top limit of electricity cost or power consumption amount in relation to driving the certain component.

In other words, the display unit 160 is formed to display the character-display part 170 first. Also, graphs related daily information and statistical information are not displayed and may be displayed by inputting the additional graph selector 185.

In FIG. 24, there is illustrated a graph displayed in the display unit 160 when inputting the daily information selector 186, which corresponds to the daily information graph 181 of FIG. 20.

When the daily information selector 186 is inputted, a change in daily information related to energy information is illustrated as a graph. The display unit 160 includes a display content selector 169 capable of selecting one of displays for electricity cost and power consumption amount.

The user may select a subject of display by touching the display content selector 169.

In FIG. 25, there is illustrated a graph displayed in the display unit 160 when inputting the statistical information selector 187, which corresponds to the statistical information graph 182.

When the statistical information selector 187 is inputted, a change in statistical information related to energy information is illustrated as a graph. The user may select a statistical time period to be displayed, that is, any one of daily, weekly, monthly, and yearly. An energy information change in the selected statistical time period may be illustrated.

In one of the phases as shown in FIGS. 24 and 25, a conversion to a previous screen may be performed by inputting a certain input unit or touching the main screen 161. On the other hand, in one of the phases as shown in FIGS. 24 and 25, when a previously set amount of time elapses, there may be performed an automatic conversion to the screen illustrated in FIG. 23. Also, it may be selected whether to perform a screen conversion manually such as inputting an input unit or automatically according to the elapse of time.

Not shown in the drawing, when selecting the option selector 190, it may be selected whether the screen conversion is performed manually or automatically.

Also, a speed of automatic screen conversion may be set. When the speed of automatic screen conversion is set, the screens shown in FIGS. 23, 24, and 25 may be sequentially displayed according to the elapse of time.

There is provided another embodiment.

In FIGS. 23 to 25, it is disclosed that the character-display part 170 is displayed first and one of daily information and statistical information is displayed by selecting the graph selector 185.

However, on the contrary, one of the daily information and the statistical information may be displayed first and the character-display part 170 may be displayed by inputting an additional input unit or touching the screen.

Therefore, it may be considered that any one of the character-display part 170 and the graph-display part 180 may be displayed on the display unit 160 and another one thereof may be displayed by inputting an additional command such as inputting an input unit or touching the screen, or automatic conversion.

According to embodiments, an energy source can be efficiently produced, used, distributed, and stored, thus enabling the effective management of the energy source.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A component capable of communicating with a network system, the component comprising:
 a communication unit to communicate with the network system;
 an information notification part to notify one or more pieces of information among energy information, additional information except the energy information, and new information based on one or more of the energy information and the additional information except the energy information; and
 a control unit to control the information notification part, wherein the information notification part notifies one or more pieces of the information when the control unit determines that a condition for notifying one or more pieces of the information is satisfied, wherein one or more of the information comprises character information and graph information displayed simultaneously on a screen, wherein the screen includes a first region that displays the character information, a second region that displays the graph information, and a third region surrounding the first and second regions, wherein when one of the first and second regions is selected, the selected region is enlarged and the unselected region is reduced.

2. The component of claim 1, wherein the energy information comprises energy cost information and information except energy cost, wherein the energy cost information comprises one or more of cost for energy and energy consumption cost, and wherein the information except energy cost comprises one or more of energy reduction, emergency situation, grid safety, energy increase, operation priority, and energy consumption amount.

3. The component of claim 1, wherein the energy information comprises one or more of present energy information, past energy information, and estimated future energy information.

4. The component of claim 1, wherein the energy information comprises one or more of information in a time period, information at a time point, information related to operation, and accumulated information related to operation.

5. The component of claim 1, wherein the energy information comprises one or more of a number of residual times, a residual cost, and a residual amount of power capable of operating before a reference energy cost.

6. The component of claim 1, wherein the energy information comprises information on a kind of an energy supply source.

7. The component of claim 1, wherein the additional information comprises one or more of environment information, time information, information related to one or more components, information related other components, and a user using the one or more components.

8. The component of claim 1, wherein the control unit receives or generates one or more pieces of the information among the energy information, the additional information except the energy information, and the new information based on one or more of the energy information and the additional information except the energy information.

9. The component of claim 1, wherein one or more pieces of the information notified by the information notification part is changed when one or more of the energy information, the additional information except the energy information, and the new information based on one or more the energy information and the additional information except the energy information is changed.

10. The component of claim 1, wherein the information notification part notifies one or more pieces of the information in one or more of a case of at least one of inputting a kind of information to be notified and a commencement of selecting a subject, a case of sensing at least one of a contact of a human body, a case of satisfying an environment condition previously set, a case of satisfying a time previously set, a case where a value sensed by a sensor meets a predetermined reference value, a case corresponding to an operation restriction condition previously set in relation to at least one of the energy information and the additional information, a case where the control unit recognizes new information, a case where at least one of operation and phase of the component varies, and a case where at least one of phase and kind of information recognized by the control unit varies.

11. The component of claim 1, wherein the condition for notifying one or more of the information varies with received information among energy information, additional information except the energy information, and new information based on one or more of the energy information and the additional information except the energy information.

12. The component of claim 1, wherein a time period of notifying of one or more of the information is set based on information among energy information, additional information except the energy information, and new information based on one or more of the energy information and the additional information except the energy information.

13. The component of claim 1, wherein a notification method is set differently depending on a subject of the information notified by the information notification part.

14. The component of claim 1, wherein a notification method of one or more of the information is varied with a change of the information among energy information, additional information except the energy information, and new information based on one or more of the energy information and the additional information except the energy information.

15. The component of claim 1, wherein the information notification part comprises one or more of a display unit, a light emitting unit, a sound generation unit, an aroma generation unit, and a vibration generation unit.

16. The component of claim 1, wherein one or more of the character information and the graph information is capable of disappearing from the screen or being reduced.

17. The component of claim 1, wherein, in a phase where one or more of the character information and the graph information is displayed on the screen, the displayed information is capable of being converted into another one of the character information and the graph information.

18. The component of claim 1, wherein the new information comprises a recommended driving method for saving an energy cost or an energy consumption amount.

19. The component of claim 18, wherein the control unit determines the recommended driving method based on a driving method having a driving time and a course.

20. The component of claim 18, wherein if a time related to an operation of the component is received by the control unit, the control unit controls the information notification part to notify a power saving operation time for the component for reducing the energy cost or the energy consumption amount based on the received time and the energy information.

21. The component of claim 18, wherein if an operation method of the component is received by the control unit, the control unit controls the information notification part to notify a power saving operation method for the component for reducing the energy cost or the energy consumption amount based on the received operation method and the energy information.

22. The component of claim 18, wherein if an energy usage cost or an energy usage amount of the component is received by the control unit, the control unit controls the information notification part to notify an operation method for the component based on the energy information and the received energy usage cost or energy usage amount so as to result in the energy cost or the energy consumption amount lower than the received energy usage cost or energy usage amount.

23. The component of claim 18, wherein in a state where an operation condition is not received by the control unit for the component, the control unit controls the information notification part to notify an optimal operation time from a current time to a certain time for the component.

24. The component of claim 1, wherein the energy information comprises a high period, an output of the component is decreased by the control unit after the control unit recognizes the high period.

25. The component of claim 1, wherein the energy information comprises a high price time period, when the high price time period is included within at least one portion of a driving time period of the component, the control unit causes the driving time period of the component to be changed.

26. The component of claim 1, wherein one or more of the character information and the graph information is designated as activation of the information notification part, and the other of the character information and the graph information is reduced is designated as deactivation.

* * * * *